US011320898B2

(12) United States Patent
Yakishyn et al.

(10) Patent No.: US 11,320,898 B2
(45) Date of Patent: May 3, 2022

(54) DEVICE AND METHOD FOR PROVIDING CONTENT

(71) Applicant: Samsung Electronics Co., Ltd, Suwon-si (KR)

(72) Inventors: Yevhenii Yakishyn, Kyiv (UA); Oleksandr Radomskyi, Kharkov (UA); Oleksandr Shchur, Kyiv (UA)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/045,545

(22) Filed: Jul. 25, 2018

(65) Prior Publication Data

US 2019/0033962 A1 Jan. 31, 2019

(30) Foreign Application Priority Data

Jul. 25, 2017 (KR) ........................ 10-2017-0094109

(51) Int. Cl.
  G06F 3/01 (2006.01)
  G06F 3/0346 (2013.01)
  (Continued)

(52) U.S. Cl.
  CPC ........... G06F 3/012 (2013.01); G02B 27/017 (2013.01); G06F 3/013 (2013.01); G06F 3/017 (2013.01);
  (Continued)

(58) Field of Classification Search
  CPC .......... G06F 3/012; G06F 3/013; G06F 3/017; G06F 3/0346; G06F 3/0485; G06F 3/011;
  (Continued)

(56) References Cited

U.S. PATENT DOCUMENTS 8,520,935 B2   8/2013 Wang et al.
2010/0259610 A1 10/2010 Petersen
(Continued)

FOREIGN PATENT DOCUMENTS

CN   105578355 A   5/2016
CN   106125930 A   11/2016
(Continued)

OTHER PUBLICATIONS

International Search Report dated Dec. 3, 2018 in connection with International Patent Application No. PCT/KR2018/008428, 3 pages.
(Continued)

*Primary Examiner* — Jose R Soto Lopez

(57) ABSTRACT

A device and a method is provided. The method includes identifying a sight direction of the device based on the movement information. The method also includes identifying an angle formed between a first straight line that starts from a predetermined position on the display and corresponds to the identified sight direction, and a second straight line that starts from the predetermined position and corresponds to a direction according to a movement trajectory obtained from multiple frames. The method further includes determining whether to start an adjusting mode for providing a frame corresponding to the identified sight direction based on the identified angle and a threshold value determined with respect to a field of view of the device. The method additionally includes identifying a first frame and a second frame among the multiple frames. The method also includes displaying the first frame and then display the second frame.

14 Claims, 15 Drawing Sheets

(51) Int. Cl.
*G02B 27/01* (2006.01)
*G06F 3/0485* (2022.01)
*G06T 7/246* (2017.01)
*G06T 11/60* (2006.01)

(52) U.S. Cl.
CPC .......... *G06F 3/0346* (2013.01); *G06F 3/0485* (2013.01); *G06T 7/246* (2017.01); *G06T 11/60* (2013.01)

(58) Field of Classification Search
CPC ............ G02B 27/017; G02B 2027/014; G02B 2027/0187; G02B 27/0093; G06T 7/246; G06T 11/60; H04N 13/383; H04N 13/117; H04N 13/332; H04N 13/373; H04N 13/376; H04N 21/816
See application file for complete search history.

(56) References Cited

U.S. PATENT DOCUMENTS

| | | | |
|---|---|---|---|
| 2015/0022559 A1 | 1/2015 | Kim | |
| 2015/0029304 A1 | 1/2015 | Park | |
| 2015/0249815 A1 | 9/2015 | Sandrew et al. | |
| 2015/0331242 A1* | 11/2015 | Cho | G02B 27/0172 345/8 |
| 2016/0009411 A1* | 1/2016 | Davalos | G06F 3/012 345/156 |
| 2016/0232879 A1 | 8/2016 | Han et al. | |
| 2016/0238852 A1* | 8/2016 | Ellsworth | G06F 1/163 |
| 2016/0282619 A1* | 9/2016 | Oto | G06F 3/012 |
| 2016/0349972 A1* | 12/2016 | Miyoshi | G06F 16/26 |
| 2016/0364198 A1* | 12/2016 | Song | G06F 3/1454 |
| 2017/0084086 A1* | 3/2017 | Pio | H04N 21/816 |
| 2017/0144079 A1* | 5/2017 | Bear | G06F 3/012 |
| 2017/0171539 A1* | 6/2017 | Inomata | H04N 13/378 |
| 2017/0220105 A1* | 8/2017 | Ogata | G06F 3/012 |
| 2017/0255256 A1* | 9/2017 | Kim | G06F 3/012 |
| 2017/0329480 A1* | 11/2017 | Ishikawa | G06F 3/012 |
| 2017/0354883 A1* | 12/2017 | Benedetto | G06T 11/60 |
| 2018/0109902 A1 | 4/2018 | Jin | |
| 2018/0164593 A1* | 6/2018 | Van Der Auwera | H04N 21/816 |
| 2018/0190036 A1* | 7/2018 | Kim | G06T 19/006 |
| 2018/0255284 A1* | 9/2018 | Holzer | G06F 3/0485 |
| 2018/0373414 A1* | 12/2018 | Baba | G06F 3/017 |
| 2019/0012826 A1* | 1/2019 | Melkote Krishnaprasad | G06T 15/205 |
| 2019/0018477 A1* | 1/2019 | Fujiwara | G06F 3/012 |
| 2019/0018498 A1* | 1/2019 | West | G06F 3/04845 |
| 2019/0025588 A1* | 1/2019 | Osterhout | H04N 5/232 |
| 2019/0088018 A1* | 3/2019 | Shenton | A63F 13/26 |
| 2019/0164354 A1* | 5/2019 | Sasaki | G02B 27/0101 |
| 2019/0172410 A1* | 6/2019 | Okumura | G09G 5/00 |
| 2019/0180607 A1* | 6/2019 | Yokoyama | H04Q 9/00 |
| 2019/0220087 A1* | 7/2019 | Ishii | A63F 13/25 |
| 2019/0220088 A1* | 7/2019 | Ishii | A63F 13/25 |
| 2019/0251672 A1* | 8/2019 | Lim | G06T 5/002 |
| 2019/0317595 A1* | 10/2019 | Nakata | H04N 13/383 |
| 2019/0340827 A1* | 11/2019 | Abercrombie | G06F 3/04815 |
| 2019/0369404 A1* | 12/2019 | Joshi | H04N 13/344 |
| 2019/0387214 A1* | 12/2019 | Huang | H04L 65/4084 |
| 2020/0162664 A1* | 5/2020 | Maeda | G06F 3/012 |
| 2020/0179077 A1* | 6/2020 | Matsuura | G06F 3/01 |
| 2020/0197825 A1* | 6/2020 | Bear | H04N 7/157 |
| 2020/0221030 A1* | 7/2020 | Hong | H04N 5/23248 |
| 2020/0249752 A1* | 8/2020 | Parshionikar | G06F 3/04817 |

FOREIGN PATENT DOCUMENTS

| | | |
|---|---|---|
| EP | 2752733 A1 | 7/2014 |
| JP | 2015-231106 A | 12/2015 |
| JP | 2017-084323 A | 5/2017 |
| KR | 10-2016-0096422 A | 8/2016 |
| KR | 10-2016-0135660 A | 11/2016 |
| KR | 10-2017-0031676 A | 3/2017 |
| KR | 10-2017-0062376 A | 6/2017 |

OTHER PUBLICATIONS

Written Opinion of the International Searching Authority dated Dec. 3, 2018 in connection with International Patent Application No. PCT/KR2018/008428, 5 pages.
Supplementary European Search Report dated Jun. 9, 2020 in connection with European Patent Application No. 18 83 8093, 10 pages.
Notification of the First Office Action dated Nov. 4, 2020 in connection with Chinese Application No. 201880038336.3, 15 pages.
Notification of the Reasons for Rejection dated Sep. 15, 2021, in connection with Korean Application No. 10-2017-0094109, 10 pages.

* cited by examiner

DEVICE AND METHOD FOR PROVIDING CONTENT

CROSS-REFERENCE TO RELATED APPLICATION AND CLAIM OF PRIORITY

This application is based on and claims priority under 35 U.S.C. § 119(a) to Korean Patent Application No. 10-2017-0094109 filed on Jul. 25, 2017 in the Korean Intellectual Property Office, the disclosure of which is incorporated by reference herein in its entirety.

BACKGROUND

1. Field

The present disclosure relates to a device and a method for providing content.

2. Description of the Related Art

Virtual reality (VR) is created by artificial technology using a computer, etc., and refers to a technology itself or a specific environment which is similar to reality but is not real. The environment or situation created via VR may stimulate a user's five senses and may allow the user to have spatial and temporal experiences similar to reality. Further, the user may interact with objects implemented in VR by performing control or executing commands by using an actual device, as well as simply being immersed in the VR. VR may be distinguished from a simulation that is unilaterally implemented in that VR enables mutual interaction with a user and creates user experiences.

A user may move while using a VR device, and the VR device may provide VR content reflecting the movement of the user.

SUMMARY

The present disclosure provides a device and a method for providing VR content reflecting a change in a viewing direction according to movement of a user watching the VR content, when the user freely travels or moves.

A device according to an embodiment may include: a display; a positioning sensor configured to measure movement of the device and output movement information related to the measured movement; a memory; and a controller configured to: identify a sight direction of the device based on the movement information; identify an angle formed between a straight line, which starts from a predetermined position on the display and corresponds to the identified sight direction, and a straight line, which starts from the predetermined position and corresponds to a direction according to a movement trajectory obtained from multiple frames stored in the memory; determine to start an adjusting mode for providing a frame corresponding to the identified sight direction based on the identified angle and a threshold value determined with respect to a field of view of the device; in the adjusting mode, identifying a first frame and a second frame among the multiple frames based on the identified sight direction; and control the display to display the first frame and then display the second frame.

A method of a device according to an embodiment includes: identifying a sight direction of the device based on movement information generated by measuring movement of the device; identifying an angle formed between a straight line, which starts from a predetermined position on a display included in the device and corresponds to the identified sight direction, and a straight line, which starts from the predetermined position and corresponds to a direction according to a movement trajectory obtained from multiple frames; determining whether to start an adjusting mode for providing a frame corresponding to the identified sight direction based on the identified angle and a threshold value determined with respect to a field of view of the device; in the adjusting mode, identifying a first frame and a second frame among the multiple frames based on the identified sight direction; and displaying the first frame and then displaying the second frame.

According to the present disclosure, a VR device can provide a user with a frame reflecting a change in a sight direction of the VR device according to the user's motion or move.

The user may move when using the VR device, and may find an object located on a moving trajectory within a virtual reality content while moving his/her head to the right and left. Further, the user can observe the found object by moving his/her head in several directions, such as tilting his/her head or moving his/her head to the right or left. When the user moves his/her head in several directions, the VR content provides the user with object images corresponding to moving points of view so that the user can observe the object in several directions. The user can also observe a rear view of the object while moving. Accordingly, the VR device can provide a more realistic content and can cause a new level of interest enabling the user to control the VR content, such that the user can subjectively observe the object as in the real world. Even if a visual direction of the VR device is out of a viewing angle of the user, the VR device provides the VR content corresponding to the sight direction. Therefore, a field of view (FOV) that the VR device can provide may be increased.

The VR device identifies movement of the user and provides a frame corresponding to the identified movement. For example, when the user tilts his/her head backward, the VR device can provide a second frame to the user after a first frame, wherein the second frame has been provided at a second point of view that is a point of view preceding as much as the time corresponding to a moving distance created when the user has tilted his/her head backward with respect to the first frame provided to the user at a first point of view.

Further, when the user tilts his/her head forward, the VR device can provide a third frame to the user after the first frame, wherein the third frame is a frame provided at a third point of view that is a point of view preceding as much as the time corresponding to a moving distance created when the user has tilted his/her head forward with respect to the first frame provided to the user at the first point of view. Therefore, the user can see a past view or a future view of the object by tilting his/her head. Such functions enable the VR device to provide the user with VR content having an increased degree of freedom (DOF).

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments will be described in detail with reference to the accompanying drawings. In the following description of the present disclosure, a detailed description of known configurations or functions incorporated herein will be omitted when it is determined that the detailed description may make the subject matter of the present disclosure unclear. The terms as described below are defined in consideration of the functions in the embodiments, and the meaning of the terms may vary according to the intention of a user or operator, convention, or the like. Therefore, the definitions of the terms should be made based on the contents throughout the specification.

Although terms of a first, a second, etc. are used to describe various elements, these elements are not limited by these terms. These terms are used to only distinguish one element from another element. Therefore, a first element that will be mentioned hereinafter may be a second element within the technical scope of the present disclosure.

First, with reference to FIG. 1, an operation procedure of a virtual reality (VR) device will be described according to an embodiment.

Figure 1:
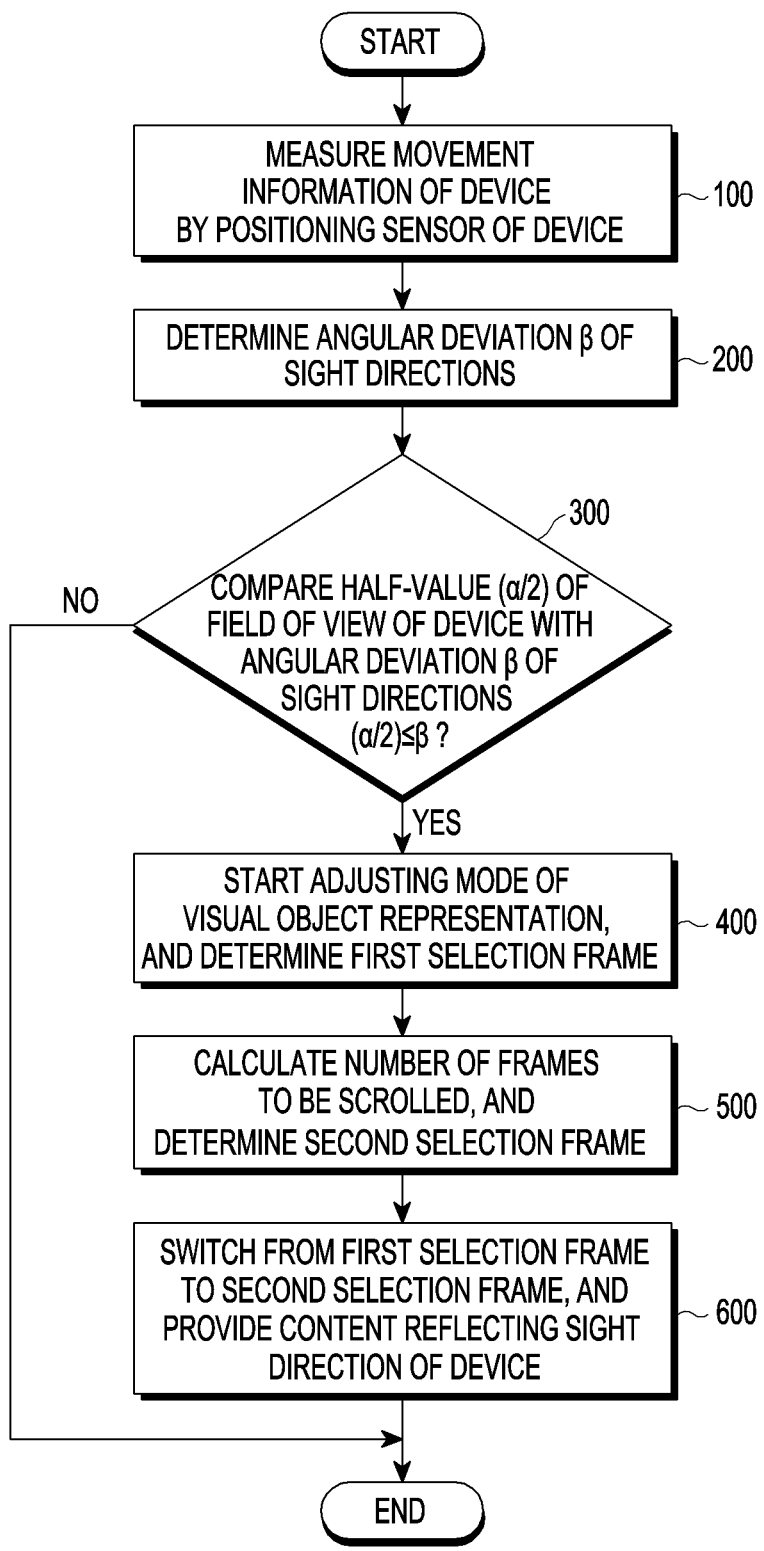
FIG. 1 illustrates a flowchart for an operation procedure of a VR device according to an embodiment of the present disclosure.

FIG. 1 illustrates a flowchart for an operation procedure of a VR device according to an embodiment of the present disclosure.

A VR device according to an embodiment may be an electronic device, such as a terminal, a smartphone, a vehicle, glasses, goggles, or a head mounted display (HMD) worn on a user's head. Hereinafter, it is assumed that the VR device is an HMD.

The VR device includes a positioning sensor. The VR device may detect a position change of the VR device by using the positioning sensor. The positioning sensor of the VR device measures information on movement of the VR device, in operation 100. A user may move while using the VR device. The VR device mounted on the user may follow the movement of the user. For example, the VR device may be mounted on the user's head, in which case the VR device may follow the movement of the user's head, such as turning or tilting the user's head. That is, when the VR device is an HMD, it may be assumed that the movement of the user's head and the movement of the VR device are the same. The movement of the user using the VR device may include two types of movement, i.e., translation and rotation. The translation may be represented as an x coordinate component, a y coordinate component, or a z coordinate component on an xyz coordinate system, in which rotation may be expressed as a pitch component that is a rotation about the x-axis, a roll component that is a rotation about the y-axis, and a yaw component that is a rotation about a z-axis on the xyz coordinate system. The positioning sensor may measure values for the six components of the VR device while the user is using the VR device. That is, movement information of the VR device, which is measured by the positioning sensor, may include information on the six components.

The movement information of the VR device, which is provided by the positioning sensor to the VR device, may be expressed as a deviation. Deviation means a degree of movement of the VR device, which is expressed on the basis of a reference position. In particular, deviation with respect to rotational movement may be measured as an angular deviation indicating, as an angle, a degree of rotation about a reference axis. The angular deviation may include an angle of vertical movement or an angle of horizontal movement with respect to the reference axis. When the gravity direction is the reference axis and the reference axis corresponds to the z-axis, the vertical movement relative to the reference axis may be expressed as a value for pitch that is a rotation about the x-axis and/or a value for roll that is a rotation about the y-axis. Further, the horizontal movement relative to the reference axis may be expressed as a value for yaw that is a rotation about the z-axis.

The positioning sensor may include one or more among an acceleration sensor (accelerometer) that measures an acceleration, a gyroscope that measures an angular velocity, and a magnetometer that is a geomagnetic sensor. As an example of movement information measurement, a roll value or a pitch value may be measured via the accelerometer or the gyroscope, and a yaw value may be measured via the gyroscope or the magnetometer. However, this is an example of a method of obtaining movement information of the VR device, and a type or a measurement method of the positioning sensor is not limited thereto as long as a method enables movement of the VR to be measured.

The VR device may reproduce multiple frames. One frame may include at least one 360-degree(°) image. One frame may include at least one piece of photographing time information corresponding to the one 360-degree image. The photographing time information may include time stamp information. Further, the one frame may further include information on auditory, olfactory, or tactile sensation that changes according to position or time, as well as a visual image that varies according to position or time.

The 360-degree image may be an image of a 360-degree scene surrounding a camera used for capturing the image. Alternatively, the 360-degree image may be an image obtained by merging images captured in multiple directions so that scenes surrounding the camera used for capturing the images are directed to be similar to a 360-degree scene. In addition, the 360-degree image may be an image actually captured via a camera, or may be a computer graphic image formed similar to an image actually captured via the camera. The camera used to capture the 360-degree image may be included in the VR device or may not be included in the VR device. That is, the VR device does not necessarily include the camera used to capture the 360-degree image.

Figure 2A:
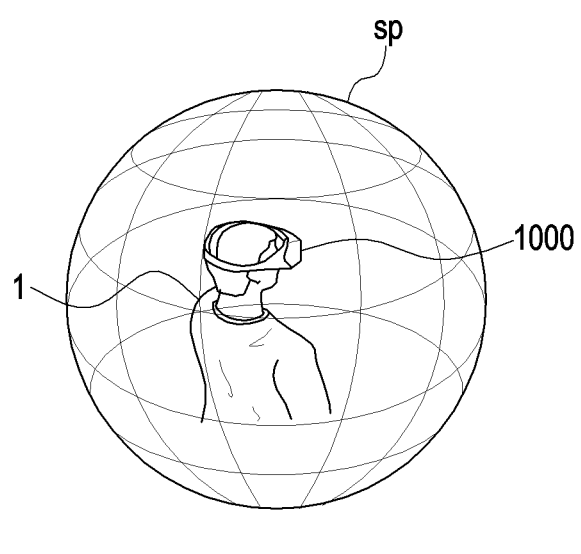
FIGS. 2A and 2B illustrate diagrams of a virtual spherical space concept and a virtual reality content concept which are provided by a VR device according to an embodiment of the present disclosure.
Figure 2B:
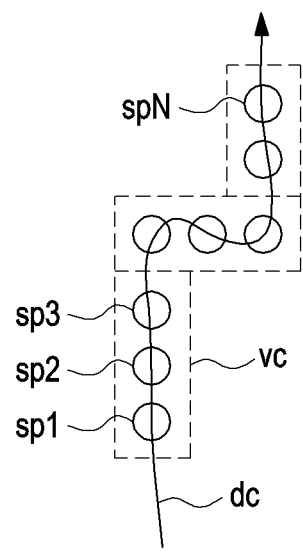

FIGS. 2A and 2B illustrate diagrams of a virtual spherical space concept and VR content concept which are provided by a VR device according to an embodiment of the present disclosure.

A 360-degree image included in a frame may be an image of a scene photographed in 360 degrees within the radius from a camera, in which the camera is able to capture an image. That is, the 360-degree image may be an image of the inner appearance of a virtual spherical space. FIG. 2A is a diagram illustrating a virtual spherical space concept provided by a VR device according to an embodiment. Referring to FIG. 2A, when a user 1 views a 360-degree image via an VR device 1000, the user 1 may feel as if he/she is at the center of the virtual spherical space sp and looking at the inside of the virtual spherical space sp.

The 360-degree image may be captured while the camera is moving. Alternatively, the 360-degree image may be a computer graphic image formed similar to the image captured while the camera is moving. When the trace generated along the movement of the camera during image capturing is referred to as a camera movement trajectory, the camera may capture an image of a scene within an angle of view of the camera at an arbitrary time interval while moving on the camera movement trajectory. Each scene photographed at each of the arbitrary time interval may be used to show one 360-degree image.

FIG. 2B is a diagram illustrating VR content concept provided by the VR device according to an embodiment. Referring to FIGS. 2A and 2B, multiple 360-degree images, which are captured according to the arbitrary time interval and included in the VR device 1000, or multiple virtual spherical spaces sp, sp1, sp2, . . . , and spN, in which the multiple 360-degree images are provided to the user 1, are gathered to constitute VR content vc. Further, the user 1 viewing the VR content vc may view scenes that change according to the camera movement trajectory dc inside the virtual spherical spaces sp, sp1, sp2, . . . , and spN.

The multiple 360-degree images may include images captured during traveling, playing sports, driving, engaging in extreme sports, and the like. The multiple 360-degree images may include images of various landscapes, objects, living things, places, buildings, etc., which are to be provided to the user, and may include images of the objects photographed in various directions. For example, the multiple 360-degree images may include images of an object photographed in several directions at an arbitrary time interval while circling around the object.

Photographing time information may include information on a time at which each of the multiple 360-degree images is captured. The photographing time information may include information on a specific time at which each of the multiple 360-degree images is captured, or may include information on the before-and-after relationship of the multiple 360-degree images. Therefore, when the multiple 360-degree images are reproduced in the order corresponding to the photographing time information for each of the 360-degree images, the user may view scenes on the basis of the camera movement trajectory, which are photographed while the camera is moving.

The VR device may provide the VR content to the user. The VR content may include multiple frames. The VR content may be multiple frames reproduced in a time sequence or may be multiple frames selectively arranged and reproduced. Since the user views already-photographed images while viewing the VR content, the user may have an experience of being in a specific environment or situation that is not real. Depending on how similar the VR content is to the real world, whether the VR content is capable of providing the user with a sense of immersion and a realistic experience may vary. Hereinafter, a procedure of selecting a frame to be reproduced to configure VR content, by the VR device 1000 will be described in detail.

Referring back to FIG. 1, the VR device determines an angular deviation β of sight directions on the basis of movement information measured by the positioning sensor, in operation 200. This will be described with reference to FIG. 3.

Figure 3:
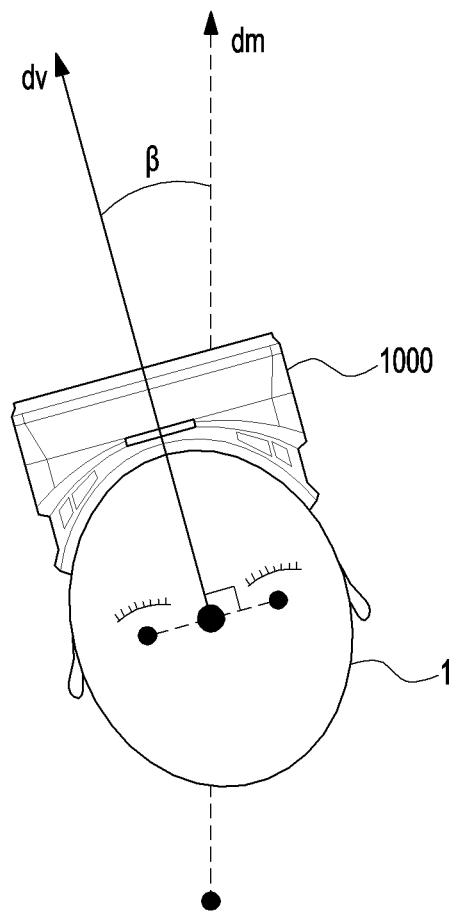
FIG. 3 illustrates a method for determining an angular deviation of sight directions of a VR device according to an embodiment of the present disclosure.

FIG. 3 illustrates a method for determining an angular deviation of sight directions of a VR device according to an embodiment of the present disclosure.

Referring to FIG. 3, the angular deviation β of sight directions represents a difference between a sight direction dv of the VR device 1000 and a frame movement trajectory dm.

The sight direction dv of the VR device 1000 may be a direction of a straight line that passes through the center of a display screen included in the VR device 1000 and is perpendicular to the surface of the display screen. The sight direction dv may be a direction passing through the center of a straight line that connects two eyes of the user 1 wearing the VR device 1000. The sight direction dv of the VR device 1000 may be determined on the basis of the movement information measured by the positioning sensor included in the VR device 1000. The sight direction dv of the VR device 1000 may be assumed to be a sight direction of the user 1 wearing the VR device 1000.

The frame movement trajectory dm may refer to a camera movement trajectory, along which multiple 360-degree images included in the multiple frames are captured, or may refer to a movement trajectory estimated from the multiple frames. That is, when the multiple 360-degree images included in the VR device 1000 are reproduced in the order corresponding to the photographing time information, the user 1 may view scenes on the basis of the camera movement trajectory, wherein the camera movement trajectory may be the frame movement trajectory dm. A coordinate system in which the camera moves and a coordinate system in which the VR device 1000 moves may be assumed to be the same coordinate system.

In an embodiment, the definition of the sight direction dv of the VR device 1000 and the definition of the frame movement trajectory dm have been described as an example. However, this may be change according to the design of a VR device according to an embodiment.

Hereinafter, a procedure of determining a frame movement trajectory dm to determine an angular deviation β of sight directions, by the VR device will be described in detail.

Figure 4:
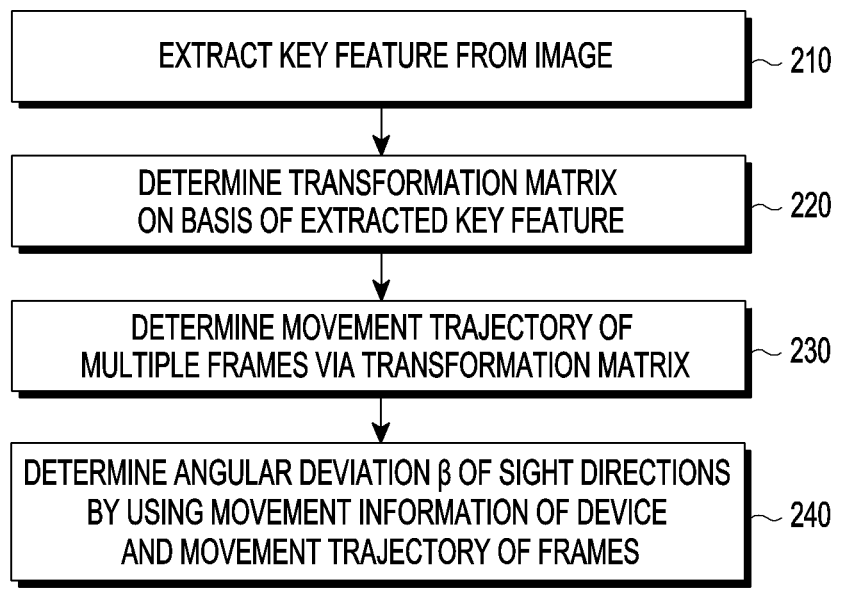
FIG. 4 illustrates a flowchart for measuring an angular deviation of sight directions of a VR device according to an embodiment of the present disclosure.

FIG. 4 illustrates a flowchart for measuring an angular deviation of sight directions of a VR device according to an embodiment of the present disclosure.

Figure 5:
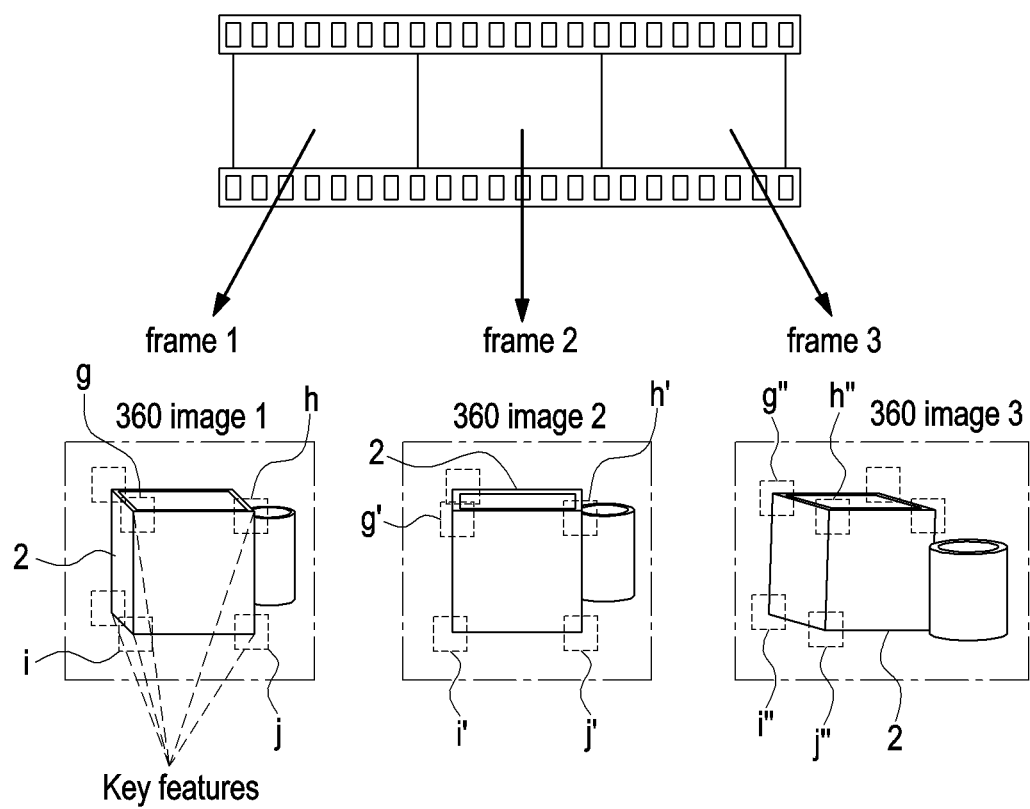
FIG. 5 illustrates a diagram of multiple frames of a VR device according to an embodiment of the present disclosure.

FIG. 5 illustrates a diagram of multiple frames of a VR device according to an embodiment of the present disclosure.

Referring to FIG. 4 and FIG. 5, the VR device may extract, in operation 210, a key feature from each of multiple 360-degree images of the multiple frames included in the VR device, and may determine, in operation 220, a matrix of transformation between frames by using the extracted key feature.

The key feature may mean a feature (g, h, i, j, g', h', i', j', g", h", i", or j") of each of the multiple 360-degree images (360 image 1, 360 image 2, and 360 image 3) included in the multiple frames (frame 1, frame 2, and frame 3), wherein the feature does not change with image distortion or rotation. For example, the key feature may include an edge, a character, etc. of an object included in the image. The VR device may extract each of the multiple key features (g, h, j, g', h', i ', j', g", h", i", or j") for an identical object 2 from multiple 360-degree images (360 image 1, 360 image 2, and 360 image 3) including views of the object 2 in different directions, and then may recognize the object 2 by comparing the multiple key features between the multiple 360-degree images.

A method of converting image data into coordinates which do not change according to a scale may be used to extract the key features. First, a scale space of a 360-degree image, which is expressed as a function of L(x, y, σ) may be calculated. Here, σ may represent a scale parameter. L(x, y, σ) may be calculated via a convolution operation of the 360-degree image I(x, y) and a variable-scale Gaussian G(x, y, σ) (Equation 1).

$$L(x, y, \sigma) = G(x, y, \sigma) * I(x, y) \quad \text{[Equation 1]}$$

Here, the variable-scale Gaussian G(x, y, σ) may satisfy Equation (2).

$$G(x, y, \sigma) = \frac{1}{2\pi\sigma^2} e^{-(x^2+y^2)/2\sigma^2} \quad \text{[Equation 2]}$$

A difference-of-Gaussians function may be calculated based on the difference between two adjacent scale spaces in which scale variables are σ, kσ, respectively. (Equation 3).

$$D(x, y, \sigma) = (G(x, y, k\sigma) - G(x, y, \sigma)) * I(x, y) \quad \text{[Equation 3]}$$
$$= L(x, y, k\sigma) - L(x, y, \sigma)$$

Further, the difference-of-Gaussians function may provide an approximation of the Gaussian scale-normalized Laplacian of Gaussian, $\sigma^2\nabla^2 G$. According to an experimental result, maximum and minimum values of $\sigma^2\nabla^2 G$ may be used to acquire a key feature of the most stable image relative to other functions.

The relationship between D and $\sigma^2\nabla^2 G$ may be acquired via Equation 4 to Equation 7 which include a heat diffusion equation (Equation 4).

$$\frac{\partial G}{\partial \sigma} = \sigma \nabla^2 G \quad \text{[Equation 4]}$$

-continued $$\sigma \nabla^2 G = \frac{\partial G}{\partial \sigma} \approx \frac{G(x, y, k\sigma) - G(x, y, \sigma)}{k\sigma - \sigma} \quad \text{[Equation 5]}$$

$$G(x, y, k\sigma) - G(x, y, \sigma) \approx (k - 1)\sigma^2 \nabla^2 G \quad \text{[Equation 6]}$$

$$D(x, y, \sigma) = (G(x, y, k\sigma) - G(x, y, \sigma)) * I(x, y) \quad \text{[Equation 7]}$$

In order to determine a local maxima and a local minima in an image using the difference-of-Gaussians function (hereinafter, referred to as a difference-of-Gaussians function image), a sample point arbitrarily selected within the difference-of-Gaussians function image and the surrounding area thereof may be compared. Specifically, a sample point may be compared with eight pixels adjacent to the sample point in a section of three rows and three columns around the sample point. Further, in each of adjacent two difference-of-Gaussians function images, nine pixels in a section of three rows and three columns may be compared with a sample point. That is, a sample point may be compared with adjacent pixels within a difference-of-Gaussians function image and may be compared with corresponding pixels in adjacent difference-of-Gaussians function images. In the case above, the sample point may be compared with 26 pixels. A sample point may be selected only if the sample point is greater than all 26 pixels or smaller than all 26 pixels. This selected sample point may be a candidate for a key point. A key point may indicate a position of a key feature on an image.

In order to remove values that are not good for indicating a characteristic of an image due to the values corresponding to contrast being too low or indicating an edge, and to select a key point capable of reliably representing the characteristic of the image from among key point candidates, the Taylor series for X of a difference-of-Gaussians function, D(x, y, σ), for the scale space may be expanded to a second term (Equation 8).

$$D(x) = D + \frac{\partial D^T}{\partial x}x + \frac{1}{2}x^T \frac{\partial^2 D}{\partial x^2}x \quad \text{[Equation 8]}$$

Here, $x = (x, y, \sigma)^T$.

A local threshold (local maxima or local minima) value, $\hat{X}$, may be obtained on the basis of determining that a derivative of Equation 8 with respect to X is 0.

$$\hat{x} = \frac{\partial^2 D^{-1}}{\partial x^2} \frac{\partial D}{\partial x} \quad \text{[Equation 9]}$$

When Equation 9 is substituted for Equation 8, a function value at $\hat{X}$ may be calculated (Equation 10).

$$D(\hat{x}) = D + \frac{1}{2}\frac{\partial D^T}{\partial x}\hat{x} \quad \text{[Equation 10]}$$

A value of Equation 10 may be used to eliminate an unstable point from a selected key point candidate group. For example, when a value of $|D(\hat{x})|$ is equal to or smaller than a predetermined value, a corresponding point may be excluded from the key point candidate group.

After selecting pixels of 16 rows and 16 columns around the selected key point, an image inside thereof may be Gaussian-blurred, and then the gradient magnitude m(x, y) and orientation θ(x, y) of each point may be determined (Equation 11 and Equation 12). Here, L may be a data value of the Gaussian-blurred image, and the gradient magnitude (Equation 11) and a direction (Equation 12) may be determined using the difference between L(x, y).

$$m(x, y) = \sqrt{(L(x+1, y) - L(x-1, y))^2 + (L(x, y+1) - L(x, y-1))^2} \quad \text{[Equation 11]}$$

$$\theta(x, y) = \tan^{-1}((L(x, y+1) - L(x, y-1))/(L(x+1, y) - L(x-1, y))) \quad \text{[Equation 12]}$$

The gradient magnitudes of the pixels of 16 rows and 16 columns may be represented using a histogram. The highest point of the histogram may be an orientation of a key point corresponding to the highest point of the histogram. In addition, for example, points having a height of about 80% or more of the highest point of the histogram may also be the orientation of the key point. Therefore, in the case of a key point having multiple highest points of similar sizes, multiple orientations may be determined for one key point.

On the basis of values obtained by determining the gradient magnitudes and directions of the key point and the surrounding part thereof, a key point descriptor indicating a feature of the surrounding shape of the key point may be determined. The pixels of 16 rows and 16 columns, in which the gradient magnitudes and directions for respective points are determined, may be multiplied by a Gaussian-weighted window function. Then, for example, the pixels of 16 rows and 16 columns may be expressed by a key point descriptor of 4 rows and 4 columns. Components of the respective pixels of 16 rows and 16 columns may be summarized into the key point descriptor of 4 rows and 4 columns. Each block of the key point descriptor of 4 rows and 4 columns may include eight arrows indicating eight directions which represent 360 degrees. Each arrow may be the sum of gradients around a corresponding direction. Therefore, a feature vector of the key point descriptor may include 128 elements, i.e., eight arrows for each of 16 (4×4) blocks. The determined multiple key point descriptors of the image may be included in the key feature of the image, which does not change with transformation of rotation of the image.

The procedure of extracting a key feature of an image has been described as an example, but the procedure of extracting a key feature is not limited thereto. A speeded up robust features (SURF) algorithm or an oriented FAST and rotated BRIEF (ORB) algorithm may be used to extract a key feature.

The VR device may determine, in operation 220, a matrix of transformation between frames by using the extracted key features. Referring back to FIG. 5, taking a first frame (frame 1) and a second frame (frame 2) as an example, wherein the first frame includes a first 360-degree image (360 image 1), and the second frame includes a second 360-degree image (360 image 2) and is positioned temporally later than the first frame (frame 1), key features (g, h, i, j . . . ) of the first 360-degree image (360 image 1) and key features (g', h', j'. . . ) of the second 360-degree image (360 image 2) may be compared. The key features (g, h, i, j . . . ) of the first 360-degree image (360 image 1) of the first frame (frame 1) and the key features (g', h', j'. . . ) of the second 360-degree image (360 image 2) of the second frame (frame 2) may match each other. Here, corresponding key features may be key features having the same value or key features having the similar values. Since the key feature is a feature that does not change even when the image is transformed or rotated, even if a camera moves during capturing images for the first frame (frame 1) and the second frame (frame 2), the key feature may not change or may barely change. Therefore, when key features corresponding to each other between the first frame (frame 1) and the second frame (frame 2) are found, it may be determined how much key points of the key features have moved. In reality, the camera has moved while capturing images for the first frame (frame 1) and the second frame (frame 2). However, since the object 2 seems to be moving from the user's perspective, it may appear that the key features have moved on the first frame (frame 1) and the second frame (frame 2). A transformation matrix, $M_{12}$, between two frames may be determined using key feature pairs (g-g', h-h', i-i', j-j'. . . ) matching each other in the first frame (frame 1) and the second frame (frame 2) (Equation 13).

$$M_{12} = \begin{vmatrix} r_{11} & r_{12} & r_{13} & t_1 \\ r_{21} & r_{22} & r_{23} & t_2 \\ r_{31} & r_{32} & r_{33} & t_3 \\ q_1 & q_2 & q_3 & q_4 \end{vmatrix} \quad \text{[Equation 13]}$$

In a transformation matrix of $M_{12}$ (Equation 13), r may represent a rotation value, and t may represent a translation value. q may represent quaternion. However, in one embodiment, q=[0, 0, 0, 1] may be set assuming that quaternion is not needed. In particular, a matrix of R (Equation 14) for rotation values may be a matrix (Equation 15) that rotates a vector by θ (radian) in the direction of the right-hand rule with respect to the z-axis.

$$R = \begin{vmatrix} r_{11} & r_{12} & r_{13} \\ r_{21} & r_{22} & r_{23} \\ r_{31} & r_{32} & r_{33} \end{vmatrix} \quad \text{[Equation 14]}$$

$$\begin{bmatrix} \cos\theta & -\sin\theta & 0 \\ \sin\theta & \cos\theta & 0 \\ 0 & 0 & 1 \end{bmatrix} \quad \text{[Equation 15]}$$

Alternatively, the matrix of R for rotation values may be a matrix (Equation 16) that rotates the vector by θ (radian) in the direction of the right-hand rule with respect to the x-axis, may be a matrix (Equation 17) that rotates the vector by θ (radian) in the direction of the right-hand rule with respect to the y-axis, and may be a matrix (Equation 18) for transformation of the scale.

$$\begin{bmatrix} 1 & 0 & 0 \\ 0 & \cos\theta & -\sin\theta \\ 0 & \sin\theta & \cos\theta \end{bmatrix} \quad \text{[Equation 16]}$$

$$\begin{bmatrix} \cos\theta & 0 & \sin\theta \\ 0 & 1 & 0 \\ -\sin\theta & 0 & \cos\theta \end{bmatrix} \quad \text{[Equation 17]}$$

$$\begin{bmatrix} Sx & 0 & 0 & 0 \\ 0 & Sy & 0 & 0 \\ 0 & 0 & Sz & 0 \\ 0 & 0 & 0 & 1 \end{bmatrix} \quad \text{[Equation 18]}$$

Further, the matrix of R for rotation values may be a matrix of $A_{XY}$ (Equation 19) that rotates the vector by φ (radian) in the direction of the right-hand rule with respect to the x-axis, and rotates the vector by θ (radian) with respect to the y-axis. The matrix of R for rotation values may be a matrix of $A_{XZ}$ (Equation 20) that rotates the vector by φ (radian) in the direction of the right-hand rule with respect to the z-axis, and rotates the vector by ψ (radian) with respect to the z-axis. The matrix of R for rotation values may be a matrix of $A_{YZ}$ (Equation 21) that rotates the vector by θ (radian) in the direction of the right-hand rule with respect to the y-axis, and rotates the vector by ψ (radian) with respect to the z-axis. The matrix of R for rotation values may be a matrix of A (Equation 22) that rotates the vector by φ (radian) in the direction of the right-hand rule with respect to the x-axis, rotates the vector by θ (radian) in the direction of the right-hand rule with respect to the y-axis, and rotates the vector by Ω (radian) with respect to the z-axis.

$$A_{XY} = \begin{bmatrix} \cos\theta & 0 & \sin\theta \\ \sin\varphi\sin\theta & \cos\varphi & -\sin\varphi\cos\theta \\ -\cos\varphi\sin\theta & \sin\varphi & \cos\varphi\cos\theta \end{bmatrix} \quad \text{[Equation 19]}$$

$$A_{XZ} = \begin{bmatrix} \cos\psi & -\sin\psi & 0 \\ \cos\varphi\sin\psi & \cos\varphi\cos\psi & -\sin\varphi \\ \sin\varphi\sin\psi & \sin\varphi\cos\psi & \cos\varphi \end{bmatrix} \quad \text{[Equation 20]}$$

$$A_{YZ} = \begin{bmatrix} \cos\theta\cos\psi & -\cos\theta\sin\psi & \sin\theta \\ \sin\psi & \cos\psi & 0 \\ -\sin\theta\cos\psi & \sin\theta\sin\psi & \cos\theta \end{bmatrix} \quad \text{[Equation 21]}$$

$$A = \begin{bmatrix} \cos\theta\cos\psi & -\cos\phi\sin\psi + \sin\phi\sin\theta\cos\psi & \sin\phi\sin\psi + \cos\phi\sin\theta\cos\psi \\ \cos\phi\sin\psi & \cos\phi\cos\psi + \sin\phi\sin\theta\sin\psi & -\sin\phi\cos\psi + \cos\phi\sin\theta\sin\psi \\ -\sin\theta & \sin\phi\cos\theta & \cos\phi\cos\theta \end{bmatrix} \quad \text{[Equation 22]}$$

Hereinafter, a method for determining the transformation matrix of $M_{12}$ shown in Equation 13 will be described.

First, a method for determining the transformation matrix of $M_{12}$ in two dimensions will be described.

In a pair of key features matching each other, when a key point of the key feature of the first frame is denoted by (u, v), and a key point of the key feature of the second frame is denoted by (x, y), a two-dimensional transformation matrix that rotates (x, y) by θ (radian) in the counterclockwise direction with respect to the origin (0,0) may be expressed as Equation 23. Here, $t_x$ and $t_y$ may correspond to values relating to translation of (x, y).

$$\begin{bmatrix} u \\ v \end{bmatrix} = \begin{bmatrix} \cos\theta & -\sin\theta \\ \sin\theta & \cos\theta \end{bmatrix} \begin{bmatrix} x \\ y \end{bmatrix} + \begin{bmatrix} t_x \\ t_y \end{bmatrix} \quad \text{[Equation 23]}$$

Transformation means rotation of an initial position using a rotation matrix, and translation of the initial position using a translation vector. When the key point of the key feature of the first frame is $F_1$, the key point of the key feature of the second frame is $F_2$, the rotation matrix is R, the translation vector is T, and the transformation matrix including the rotation matrix and the translation vector is M, the following Equation 24 is satisfied.

$$F_1 = RF_2 + T = MA \quad \text{[Equation 24]}$$

The matrix is expandable to a desired dimension by allocating 1 to a diagonal and allocating 0 to all other positions. That is, the following Equation 25 is satisfied.

$$\begin{bmatrix} u \\ v \end{bmatrix} = \begin{bmatrix} r_{11} & r_{12} \\ r_{21} & r_{22} \end{bmatrix} \begin{bmatrix} x \\ y \end{bmatrix} = \begin{bmatrix} u \\ v \\ 0 \\ 0 \end{bmatrix} = \begin{bmatrix} r_{11} & r_{12} & 0 & 0 \\ r_{21} & r_{22} & 0 & 0 \\ 0 & 0 & 1 & 0 \\ 0 & 0 & 0 & 1 \end{bmatrix} \begin{bmatrix} x \\ y \\ 0 \\ 0 \end{bmatrix} \quad \text{[Equation 25]}$$

A method of determining the transformation matrix of $M_{12}$ in two dimensions will be described as follows.

A transformation matrix including only two-dimensional rotation components may be expressed as the following Equation 26.

$$M_{2D\_rotation\_only} = \begin{bmatrix} r_{11} & r_{12} & 0 & 0 \\ r_{21} & r_{22} & 0 & 0 \\ 0 & 0 & 1 & 0 \\ 0 & 0 & 0 & 1 \end{bmatrix} \quad \text{[Equation 26]}$$

A transformation matrix including only two-dimensional translation components may be expressed as the following Equation 27.

$$M_{2D\_translation\_only} = \begin{bmatrix} 1 & 0 & 0 & t_x \\ 0 & 1 & 0 & t_y \\ 0 & 0 & 1 & 0 \\ 0 & 0 & 0 & 1 \end{bmatrix} \quad \text{[Equation 27]}$$

When the matrices shown in Equations 26 and 27 are multiplied, a two-dimensional transformation matrix including both rotational components and translation components as shown in Equation 28 may be determined.

$$M_{2D\_translation\_and\_rotation} = \begin{bmatrix} r_{11} & r_{12} & 0 & t_x \\ r_{21} & r_{22} & 0 & t_y \\ 0 & 0 & 1 & 0 \\ 0 & 0 & 0 & 1 \end{bmatrix} \quad \text{[Equation 28]}$$

A result shown in Equation 29 may be obtained using Equation 23 and Equation 24.

$$\begin{bmatrix} u \\ v \\ 0 \\ 0 \end{bmatrix} = \begin{bmatrix} r_{11} & r_{12} & 0 & 0 \\ r_{21} & r_{22} & 0 & 0 \\ 0 & 0 & 1 & 0 \\ 0 & 0 & 0 & 1 \end{bmatrix} \begin{bmatrix} x \\ y \\ 0 \\ 0 \end{bmatrix} + \begin{bmatrix} t_x \\ t_y \\ 0 \\ 0 \end{bmatrix} \quad \text{[Equation 29]}$$

Equation 29 may be expressed like Equation 30.

$$\begin{bmatrix} u \\ v \\ 0 \\ 0 \end{bmatrix} = \begin{bmatrix} r_{11} & r_{12} & 0 & t_x \\ r_{21} & r_{22} & 0 & t_y \\ 0 & 0 & 1 & 0 \\ 0 & 0 & 0 & 1 \end{bmatrix} \begin{bmatrix} x \\ y \\ 0 \\ 0 \end{bmatrix} \quad \text{[Equation 30]}$$

In Equation 30, a two-dimensional transformation matrix may be expressed like the following Equation 31.

$$\begin{bmatrix} r_{11} & r_{12} & 0 & t_x \\ r_{21} & r_{22} & 0 & t_y \\ 0 & 0 & 1 & 0 \\ 0 & 0 & 0 & 1 \end{bmatrix} \quad \text{[Equation 31]}$$

Next, a method for determining the transformation matrix of $M_{12}$ in three dimensions will be described.

A transformation matrix including only three-dimensional rotation components may be expressed as the following Equation 32.

$$M_{3D\_rotation\_only} = \begin{bmatrix} r_{11} & r_{12} & r_{13} & 0 \\ r_{21} & r_{22} & r_{23} & 0 \\ r_{31} & r_{32} & r_{33} & 0 \\ 0 & 0 & 0 & 1 \end{bmatrix} \quad \text{[Equation 32]}$$

A transformation matrix including only three-dimensional translation components may be expressed as the following Equation 33.

$$M_{3D\_translation\_only} = \begin{bmatrix} 1 & 0 & 0 & t_x \\ 0 & 1 & 0 & t_y \\ 0 & 0 & 1 & t_z \\ 0 & 0 & 0 & 1 \end{bmatrix} \quad \text{[Equation 33]}$$

When the matrices shown in Equations 32 and 33 are multiplied, a three-dimensional transformation matrix including both rotation components and translation components as shown in Equation 34 may be determined.

$$M_{3D\_translation\_and\_rotation} = \begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix} \quad \text{[Equation 34]}$$

A result shown in Equation 35 may be obtained using Equation 23 and Equation 24.

$$\begin{bmatrix} u \\ v \\ w \\ 0 \end{bmatrix} = \begin{bmatrix} r_{11} & r_{12} & r_{13} & 0 \\ r_{21} & r_{22} & r_{23} & 0 \\ r_{31} & r_{32} & r_{33} & 0 \\ 0 & 0 & 0 & 1 \end{bmatrix} \begin{bmatrix} x \\ y \\ z \\ 0 \end{bmatrix} + \begin{bmatrix} t_x \\ t_y \\ t_z \\ 0 \end{bmatrix} \quad \text{[Equation 35]}$$

Here, (u, v, w) is the key point of the key feature of the first frame, (x, y, z) is the key point of the key feature of the second frame, and $t_x$, $t_y$, and $t_z$ are values relating to translation of (x, y, z).

Equation 35 may be expressed as the following Equation 36.

$$\begin{bmatrix} u \\ v \\ w \\ 0 \end{bmatrix} = \begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix} \begin{bmatrix} x \\ y \\ z \\ 0 \end{bmatrix} \quad \text{[Equation 36]}$$

In Equation 36, the three-dimensional transformation matrix $M_{12}$ may be Equation 37.

$$\begin{bmatrix} r_{11} & r_{12} & r_{13} & t_x \\ r_{21} & r_{22} & r_{23} & t_y \\ r_{31} & r_{32} & r_{33} & t_z \\ 0 & 0 & 0 & 1 \end{bmatrix} \quad \text{[Equation 37]}$$

In a step of converting the key point (u, v) of the key feature of the first frame and the key point (x, y) of the key feature of the second frame into three-dimensional coordinates of (u, v, w) and (x, y, z) by using an algorithm, a depth map may be used.

Although the procedure of determining the transformation matrix of $M_{12}$ (Equation 13) by using a key feature has been described as above with various examples, a method may not be limited thereto as long as the method is capable of expressing transformation between frames.

The VR device may determine a direction vector for each of multiple frames on the basis of the determined transformation matrix of $M_{12}$ (Equation 13), and may determine a frame movement trajectory dm by connecting multiple direction vectors.

When a direction vector for an initial direction of the first frame is a first direction vector V1, and a direction vector of the second frame is a second direction vector V2, the VR device may determine (Equation 39) the second direction vector V2 by using the transformation matrix of $M_{12}$ (Equation 13). The first direction vector V1 may include $V_{1x}$, that is an x component, $V_{1y}$, that is a y component, and $V_{1z}$ that is a z component. The first direction vector (V1) may be a starting point of the frame movement trajectory dm, and may be an arbitrary reference point. The first direction vector V1 may be set as $V_{1x}=0$, $V_{1y}=0$, and $V_{1z}=0$, and may be set to any point. The second direction vector V2 may be determined by multiplying the first direction vector V1 and the transformation matrix of $M_{12}$ (Equation 39).

$$V_1 = \begin{bmatrix} V_{1x} \\ V_{1y} \\ V_{1z} \\ 1 \end{bmatrix} \quad \text{[Equation 38]}$$

$$V_2 = M_{12}V_1 = \begin{bmatrix} r_{11} & r_{12} & r_{13} & t_1 \\ r_{21} & r_{22} & r_{23} & t_2 \\ r_{31} & r_{32} & r_{33} & t_3 \\ 0 & 0 & 0 & 1 \end{bmatrix} * \begin{bmatrix} V_{1x} \\ V_{1y} \\ V_{1z} \\ 1 \end{bmatrix} = \quad \text{[Equation 39]}$$

$$\begin{bmatrix} r_{11} \\ r_{21} \\ r_{31} \\ 0 \end{bmatrix} V_{1x} + \begin{bmatrix} r_{12} \\ r_{22} \\ r_{32} \\ 0 \end{bmatrix} V_{1y} + \begin{bmatrix} r_{13} \\ r_{23} \\ r_{33} \\ 0 \end{bmatrix} V_{1z} + \begin{bmatrix} t_1 \\ t_2 \\ t_3 \\ 1 \end{bmatrix} * 1 =$$

$$\begin{bmatrix} r_{11}*V_{1x} + r_{12}*V_{1y} + r_{13}*V_{1z} + t_1 \\ r_{21}*V_{1x} + r_{22}*V_{1y} + r_{23}*V_{1z} + t_2 \\ r_{31}*V_{1x} + r_{32}*V_{1y} + r_{33}*V_{1z} + t_3 \\ 1 \end{bmatrix}$$

Figure 6:
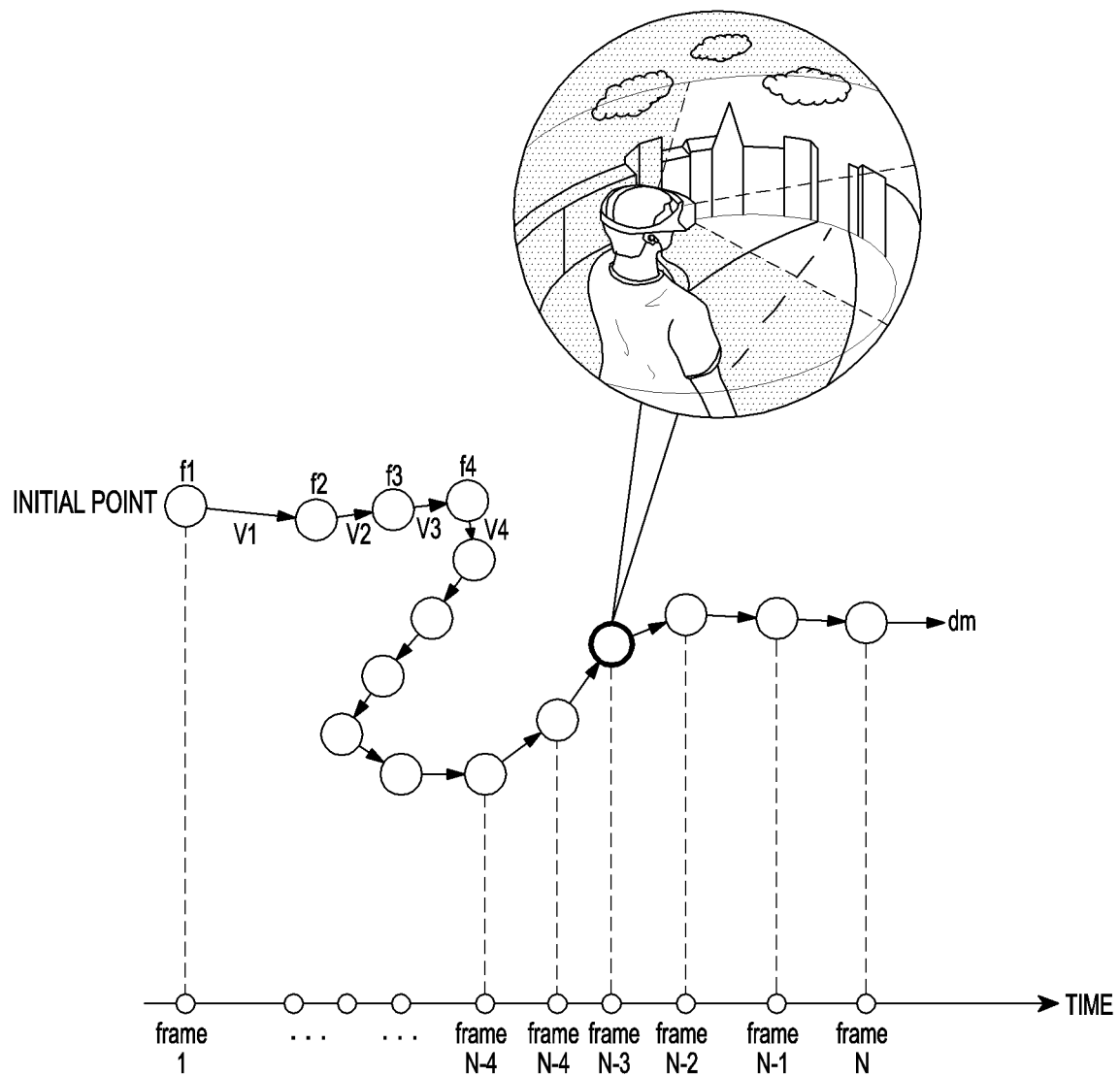
FIG. 6 illustrates a diagram of a movement trajectory of frames of the VR device according to an embodiment of the present disclosure.

FIG. 6 illustrates a diagram of a movement trajectory of frames of the VR device according to an embodiment of the present disclosure.

Referring to FIG. 6, when a first direction vector V1 and a second direction vector V2 are determined, a frame movement trajectory dm may be determined. The frame movement trajectory dm may be determined by connecting a terminal point of the first direction vector V1 and an initial point of the second direction vector V2. The frame movement trajectory dm may be determined by sequentially connecting direction vectors of respective multiple frames including a first frame and a second frame.

Referring back to FIG. 3 and FIG. 4, the VR device may determine, as an angular deviation β of sight directions, an angular difference between a sight direction dv of the VR device and the frame movement trajectory dm, in operation 240. As described above, the sight direction dv of the VR device may be included in movement information measured by the positioning sensor included in the VR device.

Figure 7A:
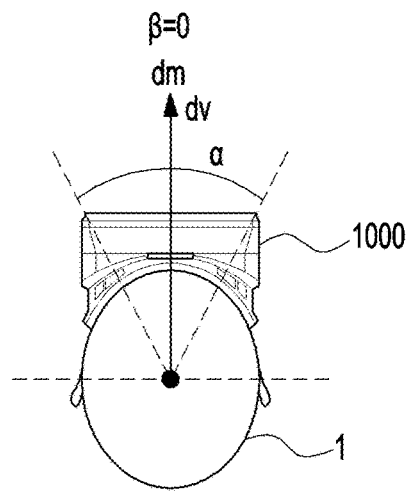
FIGS. 7A to 7C illustrate the relationship between an angular deviation of sight directions of a VR device and a field of view of the VR device according to an embodiment of the present disclosure.
Figure 7B:
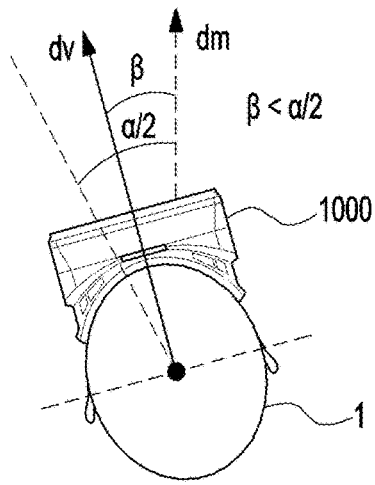
Figure 7C:
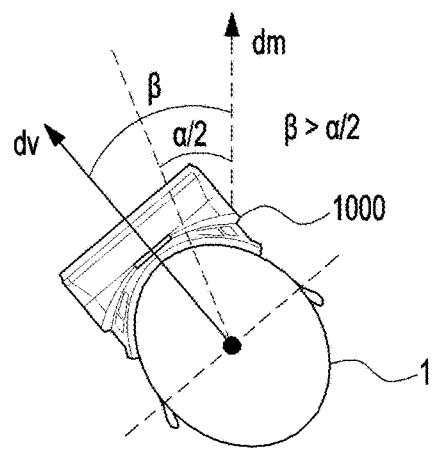

Referring back to FIG. 1 and referring to FIGS. 7A to 7C, the VR device compares, in operation 300, the previously determined angular deviation β of sight directions with a half-value (i.e., α/2) of a field of view (FOV), α, of the VR device.

FIGS. 7A to 7C illustrate the relationship between an angular deviation of sight directions of a VR device and a field of view of the VR device according to an embodiment of the present disclosure.

The field of view, a, of the VR device 1000 may be a binocular field of view of VR content provided by the VR device 1000, wherein a direction of the frame movement trajectory dm is assumed to be the front direction and is a reference direction. The field of view, α, of the VR device 1000 may vary depending on an optical design of the VR device 1000 or a type of the VR content included in the VR device 1000.

Referring FIG. 7A, when the user 1 is looking forward, the angular deviation β of sight directions may be 0. Referring to FIG. 7B, when the user 1 performs motions, such as turning or tilting his/her head without looking forward, the angular deviation β of sight directions may have a value other than zero. In FIG. 7B, a half-value (α/2) of a field of view of the VR device 1000 is greater than the angular deviation β of sight directions (α/2>β. In the case of FIG. 7A and FIG. 7B, without starting an adjusting mode of visual object representation, the VR device 1000 may provide multiple frames to the user 1 in time sequence. In FIG.

7C, the angular deviation θ of sight directions is greater than a half-value (α/2) of a field of view of the VR device 1000 (α/2<=β).

An example of FIG. 7C will be described with reference to FIG. 8.

Figure 8:
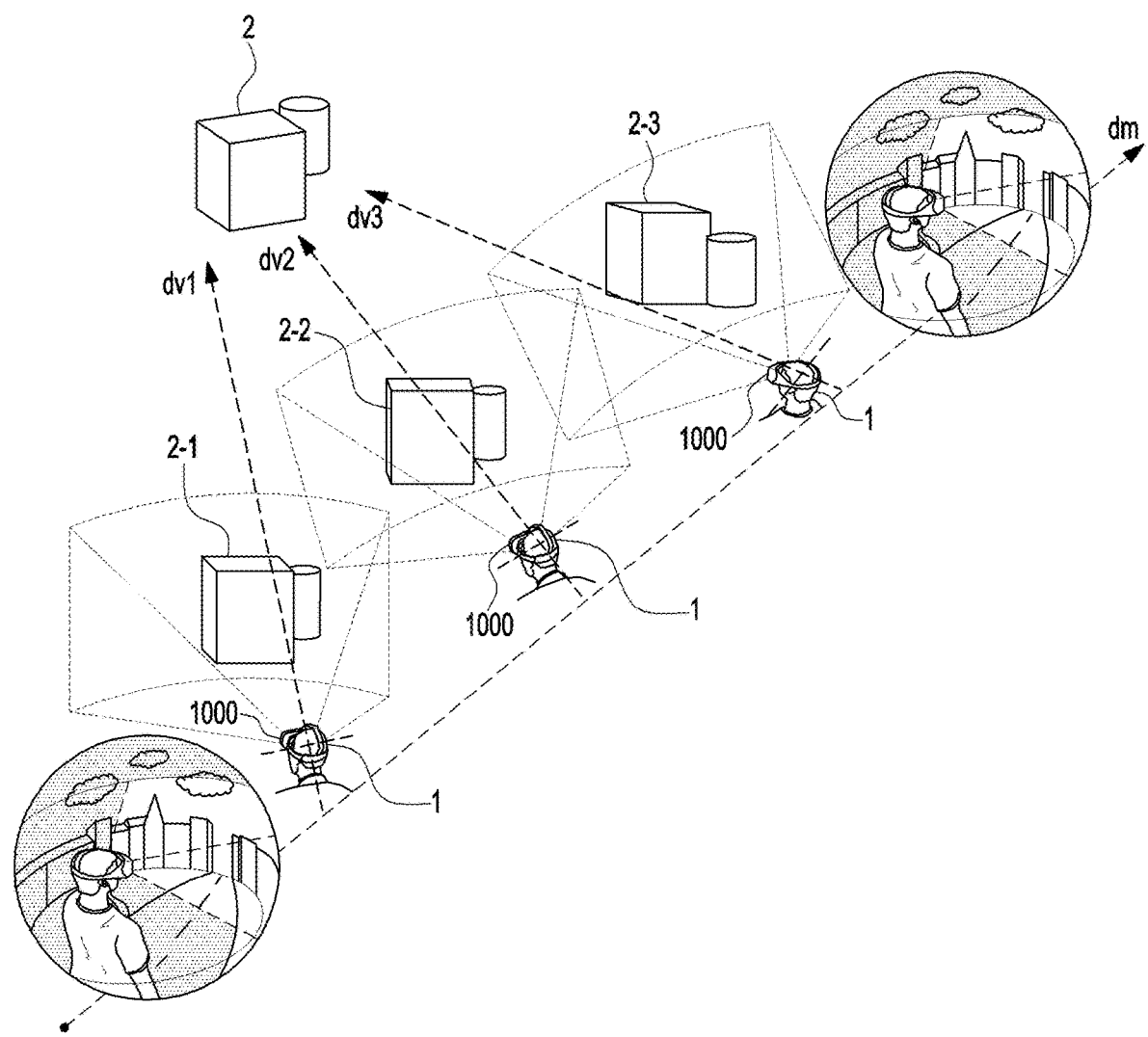
FIG. 8 illustrates a diagram of an appearance of an object shown to a user on the basis of a sight direction of a VR device according to an embodiment of the present disclosure.

FIG. 8 illustrates a diagram of an appearance of an object shown to a user on the basis of a sight direction of a VR device according to an embodiment of the present disclosure.

Referring to FIG. 8, the user 1 may travel while wearing the VR device 1000, or may move while wearing the VR device 1000 (for example, the user 1 may turn or move his/her head). When the user 1 turns his/her head and continues gazing at object 2 while traveling, a sight direction of the VR device may be continuously changed dv1, dv2, and dv3 on the basis of the frame movement trajectory dm. In this case, an angular deviation β of sight directions may become greater than a half-value of a field of view of the VR device 1000.

Referring back to FIG. 1, FIGS. 7A to 7C, and FIG. 8, in operation 400, an adjusting mode of visual object representation may start from the moment when there is movement of the head of the user 1 and an angular deviation β of sight directions is greater than a half-value (α/2) of a field of view of the VR device 1000. The adjusting mode of visual object representation may represent a mode in which when a sight direction dv of the VR device 1000 deviates from a frame movement trajectory dm beyond an arbitrary criterion, a frame suitable for the sight direction dv is selected and provided to the user 1 in order to provide VR content reflecting the corresponding sight direction dv. The arbitrary criterion may indicate a criterion for determining whether an angular deviation β of sight directions is greater than a half-value (α/2) of a field of view of the VR device 1000. If the sight direction of the VR device 1000 moves without deviating from the arbitrary criterion with respect to frame movement trajectory dm, multiple frames may be provided to the user 1 in the time sequence the frames. On the other hand, as shown in FIG. 8, when the user 1 turns his/her head and continues gazing at object 2 while traveling so that the sight direction of the VR device dv1, dv2, or dv3 deviates from a frame movement trajectory dm beyond the arbitrary criterion, at least one frame reflecting the sight direction dv1, dv2, or dv3 may be provided to the user 1. In this case, a first appearance 2-1 of the object 2 viewed in the first sight direction dv1 of the VR device 1000, a second appearance 2-2 of the object 2 viewed in the second sight direction dv2, and a third appearance 2-3 viewed in the third sight direction dv3 may be different from each other. Therefore, a frame including an appearance of the object 2, which corresponds to the sight direction dv1, dv2, or dv3, may be provided to the user 1. When the frame reflecting the sight direction of the VR device 1000 is provided to the user 1, the degree of immersion of the user 1 with respect to the VR content may be increased.

Hereinafter, a method for selecting a frame reflecting a sight direction of the VR device will be described in detail.

When a movement value of the head of the user 1 is $H_L$, a source code of a condition for starting the adjusting mode of visual object representation may be as follows.

if (β>=α/2) & $H_L$!=0 than Start_Frame_detected( );

Referring back to FIG. 1 and FIGS. 7A to 7C, when the VR device 1000 starts the adjusting mode of visual object representation, the VR device 1000 may determine a first selection frame in operation 400. That is, when at the moment when the angular deviation β of sight directions becomes greater than a half-value (α/2) of a field of view of the VR device 1000, a frame viewed by the user 1 may be determined as a first selection frame. The first selection frame may be determined by a controller included in the VR device 1000.

When the first selection frame is determined, the VR device 1000 may calculate the number of frames to be scrolled so as to determine a second selection frame, in operation 500. Here, the number of frames to be scrolled may mean the number of frames to be skipped in terms of time. Calculation to determine the second selection frame may be performed by the controller.

Figure 9:
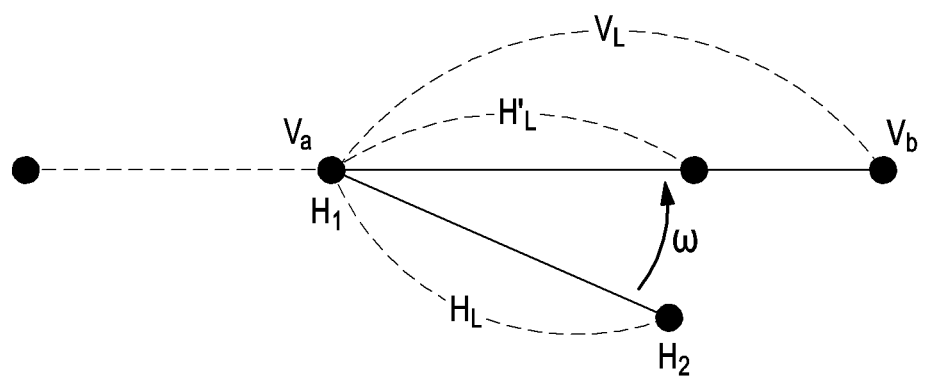
FIG. 9 illustrates a diagram for explaining a method for determining the number of frames to be scrolled in a VR device according to an embodiment of the present disclosure.

FIG. 9 illustrates a diagram for explaining a method for determining the number of frames to be scrolled in the VR device according to an embodiment of the present disclosure.

Referring to FIG. 9, when two random frames are expressed as direction vectors, such as Va=($V_{ax}$, $V_{ay}$, $V_{az}$) and Vb=($V_{bx}$, $V_{by}$, $V_{bz}$), respectively, the distance $V_L$ between the two random frames may be calculated using Equation 40. The distance $V_L$ between the two random frames may be estimated as an actual moving distance of a camera having captured images for the two random frames. Here, Va may be the first selection frame.

$$V_L = \sqrt{(V_{ax}-V_{bx})^2 + (V_{ay}-V_{by})^2 + (V_{az}-V_{bz})^2} \quad \text{[Equation 40]}$$

Further, when positions of the user, based on his/her head, in the two random frames are H1($H_{1x}$, $H_{1y}$, $H_{1z}$) and H2($H_{2x}$, $H_{2y}$, $H_{2z}$), respectively, a moving distance $H_L$ of the user's head in the two random frames may be calculated using Equation 41. Here, the moving distance $H_L$ of the user's head may be the same as a moving distance of the VR device.

$$H_L = \sqrt{(H_{1x}-H_{2x})^2 + (H_{1y}-H_{2y})^2 + (H_{1z}-H_{2z})^2} \quad \text{[Equation 41]}$$

A distance $H'_L$, in which the moving distance $H_L$ of the head of the user is projected on the distance $V_L$ between two frames, may be obtained (Equation 42). The distance $H'_L$ may be determined using the moving distance $H_L$ of the head of the user and angular deviation ω of sight directions as shown in Equation 42. And, frame count C value may be determined (Equation 43) by applying a round function to the ratio of the projected distance $H'_L$ and the distance $V_L$ between two frames. Here, the frame count C value may indicate the number of frames to be scrolled in the selected first selection frame in order to determine the second selection frame. When the frame count C value is determined, the second selection frame may be determined by scrolling as many frames as the number of frame counts C in the first selection frame.

$$H'_L = H_L \cdot \cos(\omega) \quad \text{[Equation 42]}$$

$$C = \text{round}\left(\frac{H'_L}{V_L}\right) \quad \text{[Equation 43]}$$

Although the method for determining a second selection frame has been described with an example, the method for determining a second selection frame is not limited thereto. For example, calculation may be performed in two dimensions, and when two random frames are expressed as direction vectors, such as Va=($V_{ax}$, $V_{ay}$) and Vb =($V_{bx}$, $V_{by}$), respectively, the distance $V_L$ between the two random frames may be calculated using Equation 44. Here, Va may be the first selection frame.

$$V_L = \sqrt{(V_{ax}-V_{bx})^2 + (V_{ay}-V_{by})^2} \quad \text{[Equation 44]}$$

Further, when positions of the user, based on his/her head, in the two random frames are H1 ($H_{1x}$, $H_{1y}$, and H2 ($H_{2x}$, $H_{2y}$), respectively, a moving distance $H_L$ of the user's head in the two random frames may be calculated using Equation 45.

$$H_L=\sqrt{(H_{1x}-H_{2x})^2+(H_{1y}-H_{2y})^2} \quad \text{[Equation 45]}$$

Further, as described above, a distance $H'_L$, in which the moving distance $H_L$ of the head of the user is projected on the distance $V_L$ between two frames, may be obtained (Equation 42), and a frame count C value may be determined (Equation 43) by applying a round function to the ratio of the projected distance $H'_L$ and the distance $V_L$ between two frames. When the frame count C value is determined, the second selection frame may be determined by scrolling as many frames as the number of frame counts C in the first selection frame.

Referring back to FIG. 1, when the second selection frame reflecting a sight direction of the device is determined, the VR device switches, to the second selection frame, the first selection frame that has been provided to the user, in operation 600. That is, the VR device may provide the user with the frame reflecting a change of the sight direction of the VR device according to movement of the head of the user. Taking FIG. 8 as an example, when the movement of the user 1 is observed based on the head of the user 1, a sight direction of the device may be changed from the first sight direction dv1 to the second sight direction dv2 according to the movement of the head of the user 1. In this case, according to a change of the sight direction of the VR device, the frame provided by the VR device may be switched from the first selection frame including an image of the first appearance 2-1 to the second selection frame including an image of the second appearance 2-2. Further, like the procedure of determining the second selection frame, a third selection frame including an image of the third appearance 2-3 may be determined. That is, the VR device provides the frame reflecting the sight direction so that the user may observe appearances of object 2 at several viewpoints, i.e., various sight directions. Therefore, the degree of immersion of the user with respect to the VR content may be increased.

The user may travel while using the VR device, and may find out an object located on a movement trajectory within the VR content while moving his/her head to the right and left. Further, the user can observe the found object by moving his/her head in several directions, such as tilting his/her head or moving his/her head to the right or left. When the user moves his/her head in several directions, the VR content provides the user with object images corresponding to moving points of view so that the user can observe the object in several directions. The user can also observe a rear view of the object while moving. Accordingly, the VR device can provide a more realistic content and can cause a new level of interest enabling the user to control the VR content, such that the user can subjectively observe the object as in the real world. Even if a sight direction of the VR device is out of a viewing angle of the user, the VR device provides VR content corresponding to the sight direction, so that a field of view, FOV, that may be provided by the VR device may increase.

Figure 10:
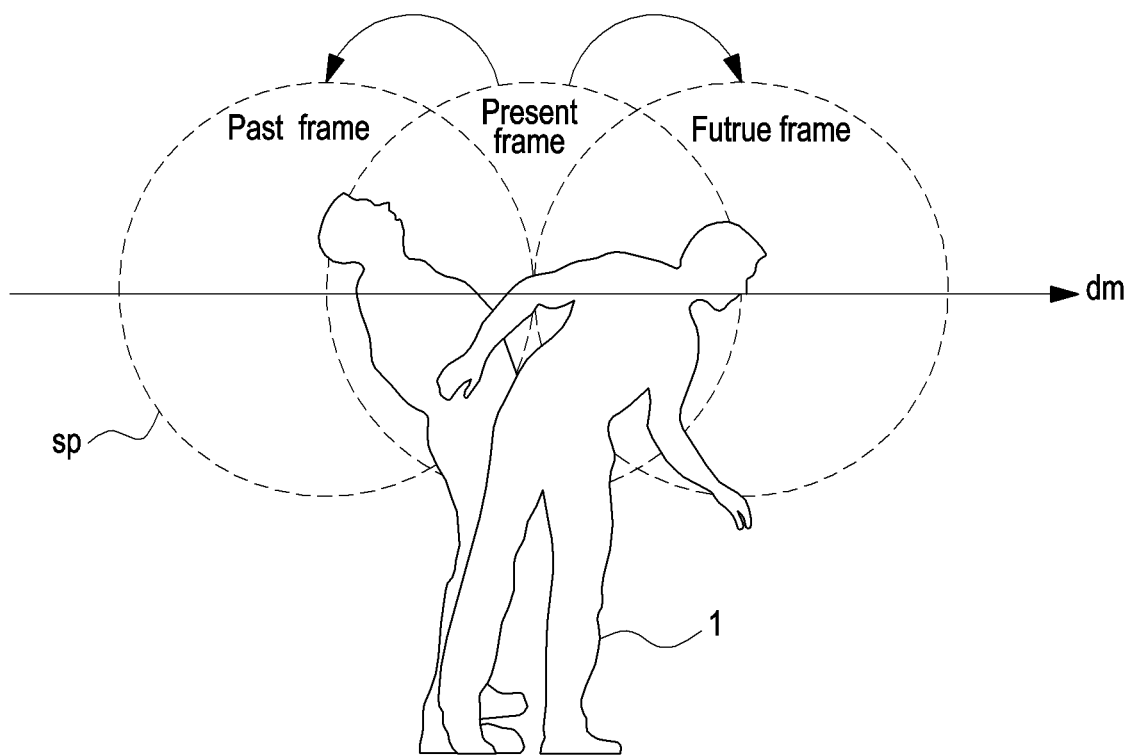
FIG. 10 illustrates a diagram for explaining the concept of switching to a past frame or a future frame in a VR device according to an embodiment of the present disclosure.

FIG. 10 illustrates a diagram for explaining the concept of switching to a past frame or a future frame in a VR device according to an embodiment of the present disclosure. FIG. 10 shows an example in which a frame is expressed as a virtual spherical space sp that may be provided to the user 1.

The VR device identifies movement of the user's head and provides a corresponding frame. Therefore, as shown in FIG. 10, when the user 1 tilts his/her head backward, the VR device may provide a past frame to the user 1. The past frame may refer to a frame provided at a time point (a second time point) preceding as much as the time corresponding to a moving distance created when the user 1 tilts his/her head backward with respect to a present frame currently provided to the user 1.

Further, as shown in FIG. 10, when the user 1 tilts his/her head forward, the VR device may provide a future frame to the user 1. The future frame may refer to a frame of a time point (a third time point) that is ahead of a current time as much as the time corresponding to a moving distance created when the user 1 tilts his/her head forward with respect to the present frame. Therefore, the user 1 may see a past image of the object or a few second future image of the object by tilting his/her head. Such functions enable the VR device to provide the user with a virtual reality content having an increased degree of freedom (DOF).

Figure 11:
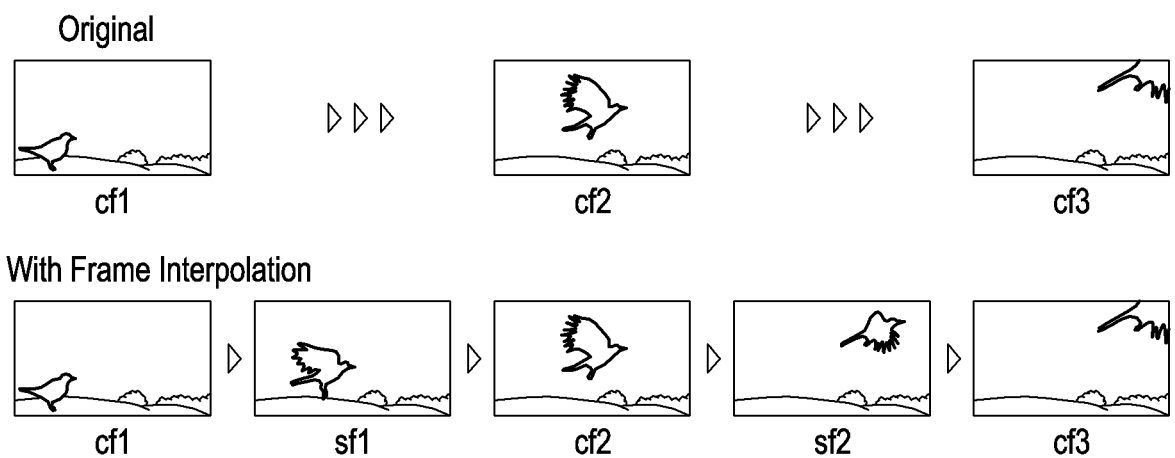
FIG. 11 illustrates a diagram of a method for inserting a reinforcement frame between selected frames in a VR device according to an embodiment of the present disclosure.

FIG. 11 illustrates a diagram of a method for inserting a reinforcement frame between selected frames in a VR device according to an embodiment of the present disclosure.

The VR device may determine a first selection frame cf1 and a second selection frame cf2, and then may insert a first reinforcement frame sf1 between the first selection frame cf1 and the second selection frame cf2. Accordingly, the VR device may provide natural and smooth switching between the first selection frame cf1 and the second selection frame cf2. The VR device may form the reinforcement frame by using one or more among nearest-neighbor interpolation, bilinear algorithms, bicubic algorithms, Sinc-resampling, Lanczos resampling, box sampling, mipmap, Fourier transform methods, edge-directed interpolation (EDI), and vectorization. However, a method of frame interpolation between frames is not limited thereto. On the other hand, like the method for inserting the first reinforcement frame sf1 between the first selection frame cf1 and the second selection frame cf2, the VR device may determine a third selection frame cf3 and then may insert a second reinforcement frame sf2 between the second selection frame cf2 and the third selection frame cf3.

Figure 12:
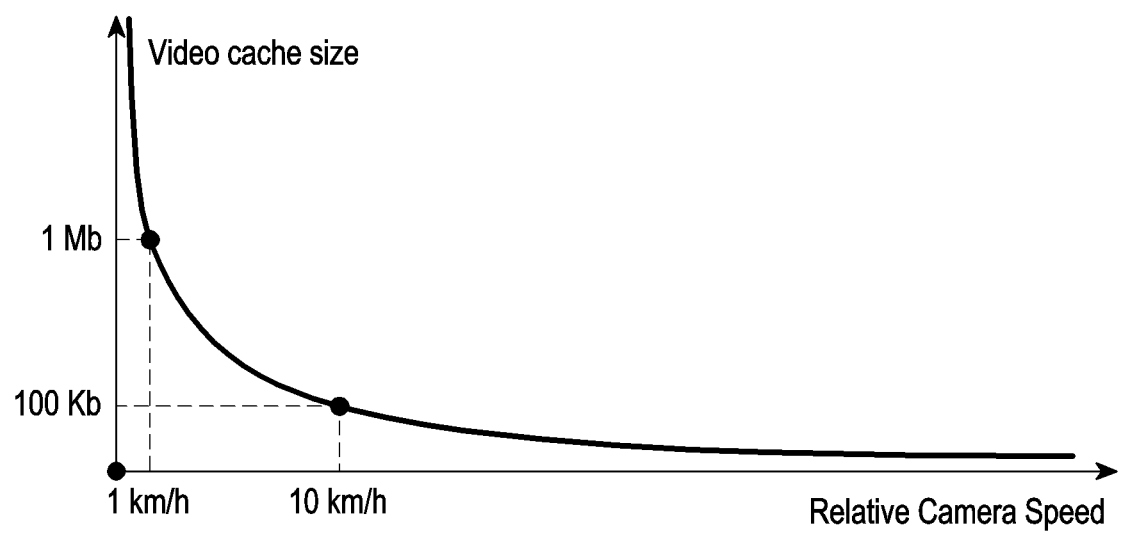
FIG. 12 illustrates graph showing the relationship between a cache size and a camera relative speed in a VR device according to an embodiment of the present disclosure.

FIG. 12 illustrates a graph showing the relationship between a cache size and a camera relative speed in the VR device according to an embodiment of the present disclosure.

The VR device having determined multiple selection frames may determine a video cache size in order to perform on-line streaming. Caching may be performed in the VR device, i.e., a client device, in order to perform calculation in real time. As shown in FIG. 12, the video cache size of the camera capturing multiple 360-degree images of the VR device may be adjusted according to the relative camera speed with respect to the object photographed by the camera. Here, the relative camera speed may refer to a speed at which the object moves in the multiple frames. Referring to an example of FIG. 12, when the relative camera speed is 10 km/h, the video cache size may be 100 Kb, and when the relative camera speed is 1 Km/h, the video cache size may be 1 Mb. That is, when the camera stops or moves slowly, the video cache size may be determined to be relatively large, and when the camera moves fast, the video cache size may be determined to be relatively small. The relative camera speed and the video cache size may be inversely related. For example, when a video is captured using the camera in a moving vehicle, the relative speed between the camera and the subject may be 20 km/h, wherein the video cache size is 50 kb. Further, for example, when a video is captured using a stop-motion camera, the relative speed between the camera and the subject may be 2 km/h, wherein the video cache size is 800 kb.

Figures 13A, 13B:
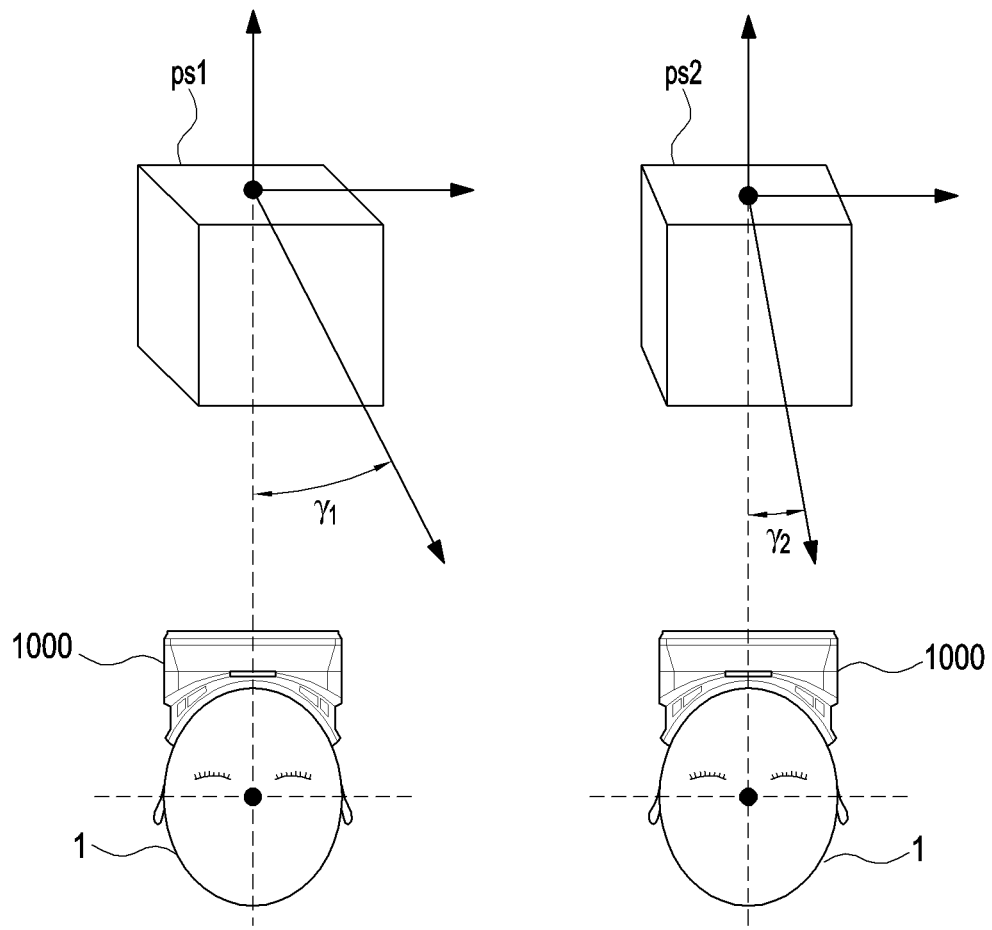
FIGS. 13A and 13B illustrate a method for measuring an angle of movement of an object between any frames in the VR device according to an embodiment of the present disclosure.

FIGS. 13A and 13B illustrate a method for measuring an angle of movement of an object between any frames in the VR device according to an embodiment of the present disclosure.

Figure 14:
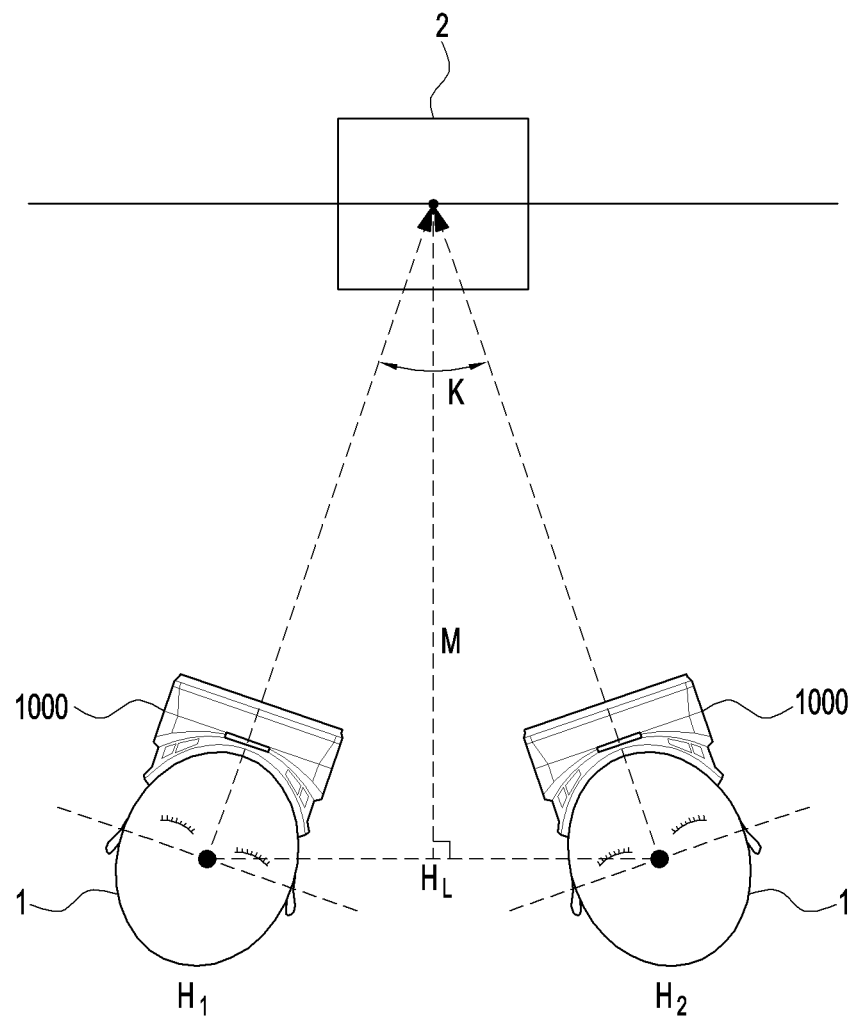
FIG. 14 illustrates a diagram for explaining a method for determining the number of frames to be scrolled in the VR device according to an embodiment of the present disclosure.

FIG. 14 illustrate a diagram for explaining a method for determining the number of frames to be scrolled in the VR device according to an embodiment of the present disclosure.

Referring to FIGS. 13A and 13B, the VR device 1000 may determine a first selection frame when starting an adjusting mode of visual object representation. When the first selection frame is determined, the VR device 1000 may determine a second selection frame by calculating the number of frames to be scrolled. Further, when two random frames are referred to as a first random frame and a second random frame, respectively, the VR device 1000 may obtain a rotated angle Δγ (Equation 46) by comparing a position psi of a specific object in the first random frame with a position ps2 of the specific object in the second random frame, wherein the specific object is an object that the user 1 is to observe. Here, the first random frame may be the first selection frame.

$$\Delta\gamma = \gamma_2 - \gamma_1 \quad \text{[Equation 46]}$$

Referring to FIG. 14, when positions of the user 1, based on his/her head, in the two random frames are H1($H_{1x}$, $H_{1y}$, $H_{1z}$) and H2 ($H_{2x}$, $H_{2y}$, $H_{2z}$), respectively, the moving distance $H_L$ of the head of the user 1 in the two random frames may be calculated using Equation 41.

In addition, a depth map of the two random frames may be determined. The depth map may be determined using one or more method of a stereo reconstruction method and a simultaneous localization and mapping (SLAM) method. However, a method for obtaining a depth map is not limited thereto. A distance M from the user 1 to the object 2 may be acquired using the depth map. Here, the distance M from the user 1 to the object 2 may be defined as an average value of the distance from the center of a straight line connecting both eyes of the user 1 to a pixel of the object 2 of the first selection frame.

An angle K of movement of the head of the user 1 may be determined (Equation 47) using a distance $H_L$ of movement of the head of the user 1 and the distance M from the user 1 to the object 2, and a frame count C value may be determined (Equation 48) by applying a round function to the ratio of the angle K of movement of the head of the user 1 and the rotated angle Δγ of the object in the two frames. When the frame count C value is determined, the second selection frame may be determined by scrolling as many frames as the number of frame counts C in the first selection frame.

$$K = 2 \cdot \text{arccot}\left(2 \cdot \frac{M}{H_L}\right) \quad \text{[Equation 47]}$$

$$C = \text{round}\left(\frac{K}{\Delta\gamma}\right) \quad \text{[Equation 48]}$$

When the second selection frame reflecting the movement of the user's head is determined, the VR device may switch, to the second selection frame, the first selection frame that has been provided to the user.

Figure 15:
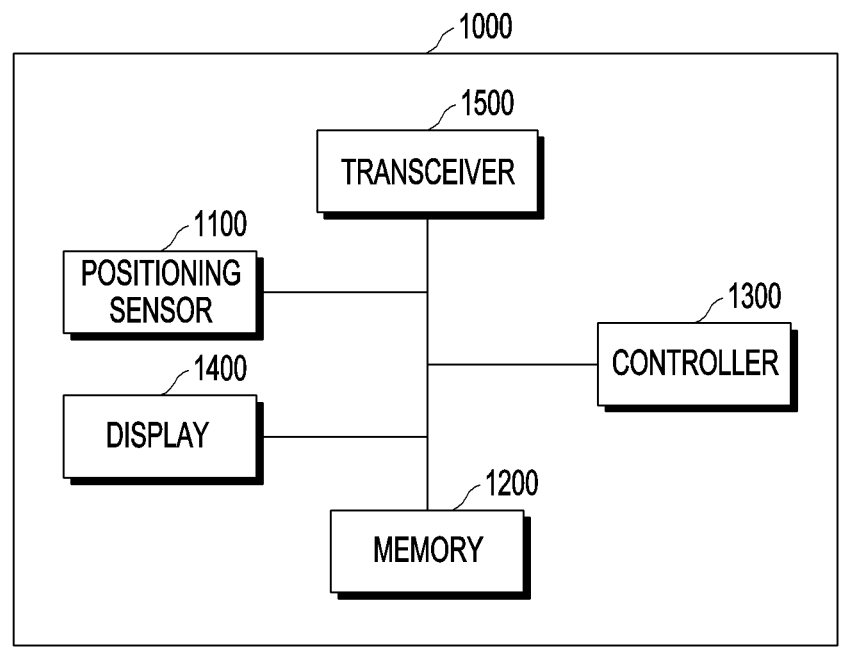
FIG. 15 illustrates a diagram providing an example of a configuration of a VR device according to an embodiment of the present disclosure.

FIG. 15 illustrates a diagram providing an example of a configuration of the VR device 1000 according to an embodiment of the present disclosure.

The VR device 1000 may include: a positioning sensor 1100 that measures movement information of the VR device 1000; a memory 1200 in which multiple frames and at least one piece of information included in the multiple frames are stored; a controller 1300 that controls all operations of the VR device 1000; a display 1400 including a display screen on which VR content provided to a user is displayed; and a transceiver 1500 that transmits a signal to and receives a signal from a base station. It may be understood that all techniques and methods performed by the VR device 1000 described in an embodiment are performed under the control of the controller 1300. However, the positioning sensor 1100, the memory 1200, the controller 1300, the display 1400, and the transceiver 1500 are not necessarily implemented as separate devices, and may be surely implemented as a single element unit in a form such as a single chip. Further, it may not be necessary that all of the positioning sensor 1100, the memory 1200, the controller 1300, the display 1400, and the transceiver1500 are included, and some of them may be omitted.

Figure 16:
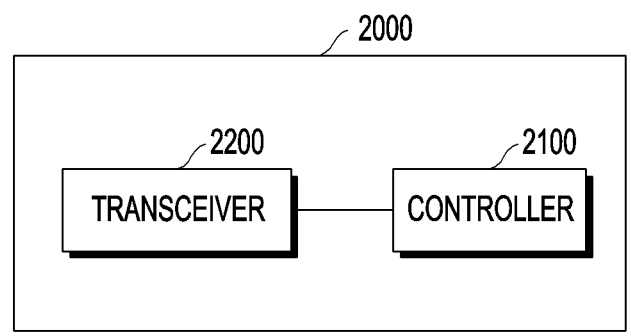
FIG. 16 illustrates a diagram providing an example of a configuration of a base station according to an embodiment of the present disclosure.

FIG. 16 illustrates a diagram providing an example of a configuration of a base station according to an embodiment of the present disclosure.

A base station 2000 may include a transceiver 2200 that transmits a signal to or receives a signal from an adjacent cell base station or a VR device, and a controller 2100 that controls all operations of the base station 2000. It may be understood that all techniques and methods performed by the base station described in an embodiment are performed under the control of the controller 2100. However, the controller 2100 and the transceiver 2200 are not necessarily implemented as separate devices, and may be surely implemented as a single element unit in a form such as a single chip.

It should be noted that method illustration, the system configuration, the device configuration, etc., that are illustrated in FIG. 1 to FIG. 16 are not intended to limit the scope of the present disclosure. That is, it should not be interpreted that all the configurations or operations described in FIG. 1 to FIG. 16 are necessary elements for embodiments, and an embodiment may be implemented, including only some of the elements, within a range that does not violate the essentials of the present disclosure.

The above-described operations may be implemented by providing a memory device, which stores corresponding program codes, to a base station of a communication system or any element unit in a VR device. That is, the base station or the controller of the VR device may perform the above described operations by reading and executing the program codes stored in the memory device by means of a processor or a central processing unit (CPU).

Various element units of the base station or the VR device, modules, etc. described in the present specification may be operated using a hardware circuit, e.g., a complementary metal oxide semiconductor-based logic circuit, firmware, software, and/or a combination of hardware and the firmware and/or software embedded in a machine readable medium. As an example, various electric configurations and methods may be carried out using electric circuits such as transistors, logic gates, and an application specific integrated circuit.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
   a display;
   a positioning sensor configured to measure movement of the device and output movement information related to the measured movement;
   a memory; and
   at least one processor operably connected to the display, the positioning sensor, and the memory, the at least one processor configured to:
   identify a sight direction of the electronic device based on the movement information, wherein the sight direction corresponds to a direction perpendicular to a center of a screen of the display,
   identify a movement trajectory of the electronic device based on multiple frames of virtual reality content,
   identify an angle formed between a first straight line which starts from a predetermined position on the display and corresponds to the identified sight direction, and a second straight line which starts from the predetermined position and corresponds to a direction according to the movement trajectory,
   determine whether to start an adjusting mode based on a comparison result between the identified angle and a threshold value,
   identify a first frame displayed on the display at a first time when the adjusting mode is started, the first frame including an object,
   identify time information corresponding to a moving distance and a moving direction of the electronic device included in the movement information,
   obtain a second frame based on the time information that is configured to indicate a capturing time of the second frame, display, on the display, the second frame at a second time,
   obtain a third frame based on the moving distance, a distance between the electronic device and the object, and a rotation angle of the object caused by a movement of the electronic device, wherein the moving distance is determined based on the first frame and the second frame, and
   display, on the display, the third frame,
   wherein the second frame is determined as a frame displayed before a time corresponding to the time information from the first time or a frame to be displayed after the time corresponding to the time information from the first time, and
   wherein the frame displayed before the time corresponding to the time information from the first time includes a past image of the object, and the frame to be displayed after the time corresponding to the time information from the first time includes a future image of the object.

2. The electronic device of claim 1, wherein the at least one processor is further configured to:
   extract one or more key points from each of the multiple frames displayed at different times;
   generate movement information of the one or more key points in time information based on a position value for each of the one or more key points in each of the multiple frames;
   determine, based on the movement information, direction vectors each of which corresponds to each of the one or more key points according to a time starting from a reference point; and
   generate the movement trajectory by connecting each of the determined direction vectors.

3. The electronic device of claim 1, wherein the electronic device is a head mounted display (HMD) device.

4. The electronic device of claim 1, wherein the memory stores multiple frames for providing a 360-degree image.

5. The electronic device of claim 4, wherein the at least one processor is further configured to, in response to determining not to start the adjustign mode, display, on the display, the multiple frames based on predetermined time information.

6. The electronic device of claim 1, wherein the at least one processor is further configured to insert a reinforcement frame between the first frame and the second frame to switch a screen.

7. A method of an electronic device, comprising:
   identifying a sight direction of the electronic device based on movement information generated by measuring movement of the device, wherein the sight direction corresponds to a direction perpendicular to a center of a screen of a display;
   identifying a movement trajectory of the electronic device based on multiple frames of virtual reality content;
   identifying an angle formed between a first straight line which starts from a predetermined position on the display and corresponds to the identified sight direction, and a second straight line which starts from the predetermined position and corresponds to a direction according to the movement trajectory;
   determining whether to start an adjusting mode based on a comparison result between the identified angle and a threshold value;
   identifying a first frame displayed on the display of the electronic device at a first time when the adjusting mode is started, the first frame including an object;
   identifying time information corresponding to a moving distance and a moving direction of the electronic device included in the movement information;
   obtaining a second frame based on the time information that is configured to indicate a capturing time of the second frame;
   displaying, on the display of the electronic device, the second frame at a second time,
   obtaining a third frame based on the moving distance, a distance between the electronic device and the object, and a rotation angle of the object caused by a movement of the electronic device, wherein the moving distance is determined based on the first frame and the second frame; and
   displaying, on the display, the third frame,
   wherein the second frame is determined as a frame displayed before a time corresponding to the time information from the first time or a frame to be displayed after the time corresponding to the time information from the first time, and
   wherein the frame displayed before the time corresponding to the time information from the first time includes a past image of the object, and the frame to be displayed after the time corresponding to the time information from the first time includes a future image of the object.

8. The method of claim 7, further comprising:

extracting one or more key points from each of the multiple frames displayed at different times;

generating movement information of the one or more key points in time information based on a position value for each of the one or more key points in each of the multiple frames;

determining, based on the movement information, direction vectors each of which corresponds to each of the multiple frames according to a time starting from a reference point; and generating the movement trajectory by connecting each of the determined direction vectors.

9. The method of claim 7, wherein the electronic device includes a head mounted display (HMD) device.

10. The method of claim 7, wherein the first and second frames provide a 360-degree image.

11. The method of claim 7, further comprising inserting a reinforcement frame between the first frame and the second frame to switch a screen.

12. The method of claim 7, further comprising displaying multiple frames of a 360-degree image based on predetermined time information in response to determining not to start the adjusting mode.

13. The electronic device of claim 1, wherein the time information includes a time stamp.

14. The method of claim 7, wherein the time information includes a time stamp.

* * * * *